(12) United States Patent
Goyal et al.

(10) Patent No.: US 7,219,339 B1
(45) Date of Patent: May 15, 2007

(54) METHOD AND APPARATUS FOR PARSING AND GENERATING CONFIGURATION COMMANDS FOR NETWORK DEVICES USING A GRAMMAR-BASED FRAMEWORK

(75) Inventors: Dinesh Goyal, Milpitas, CA (US); Mayank Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 10/284,389

(22) Filed: Oct. 29, 2002

(51) Int. Cl.
*G06F 9/45* (2006.01)

(52) U.S. Cl. .................. 717/143; 717/141; 717/142; 717/144

(58) Field of Classification Search ........ 717/140–175; 707/3–200; 709/208–222; 718/100
See application file for complete search history.

(56) References Cited

U.S. PATENT DOCUMENTS

| | | | |
|---|---|---|---|
| 6,421,661 B1* | 7/2002 | Doan et al. ............... | 707/3 |
| 2003/0037069 A1* | 2/2003 | Davison ................... | 707/200 |
| 2003/0204578 A1* | 10/2003 | Yip et al. ................. | 709/222 |
| 2004/0040016 A1* | 2/2004 | Pearce et al. ............. | 717/141 |
| 2004/0194088 A1* | 9/2004 | Chen et al. ............... | 718/100 |
| 2004/0255000 A1* | 12/2004 | Simionescu et al. ....... | 709/208 |

* cited by examiner

*Primary Examiner*—Meng-Al T. An
*Assistant Examiner*—Mark P. Francis
(74) *Attorney, Agent, or Firm*—Hickman Palermo Truong & Becker LLP

(57) ABSTRACT

A method of automatically parsing a network device configuration and generating a representation of one or more configuration commands for a network device that uses a command-line interface, using a grammar-based framework, is disclosed. One or more syntax definitions are received for a grammar associated with the command-line interface. The syntax definitions are compiled into a grammar object that represents the grammar. A configuration of the network device is received. The configuration is parsed using the grammar object. One or more configuration values are created and stored based on parsing the configuration. Using the configuration values, operating system version information, and the grammar object, one or more command-line interface commands may be automatically generated for use in configuring the device or other network management purposes. Further, applications may use the parameter values to customize a graphical user interface, perform range checking, etc.

67 Claims, 18 Drawing Sheets

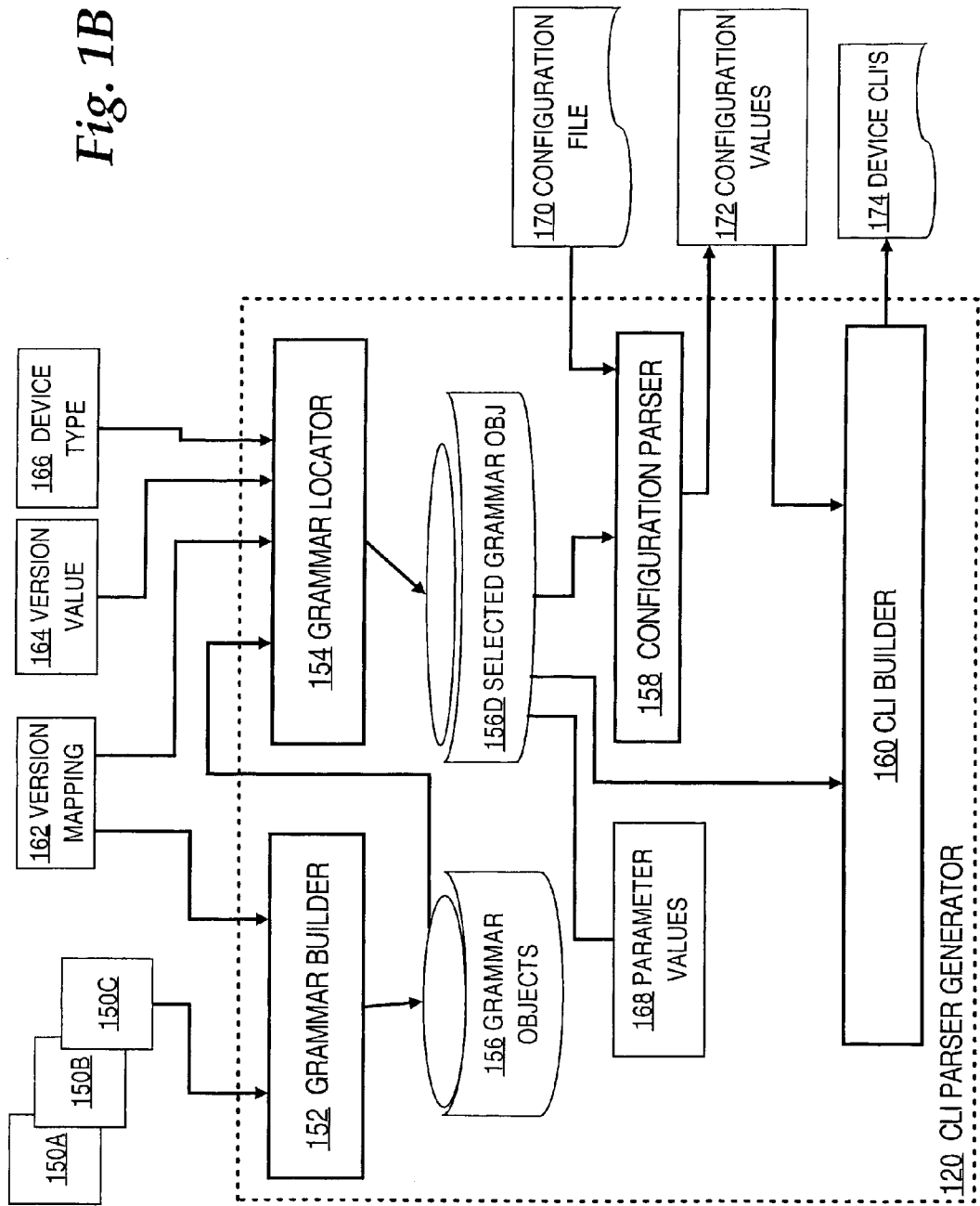

METHOD AND APPARATUS FOR PARSING AND GENERATING CONFIGURATION COMMANDS FOR NETWORK DEVICES USING A GRAMMAR-BASED FRAMEWORK

FIELD OF THE INVENTION

The present invention generally relates to management of computer networks. The invention relates more specifically to a method and apparatus for parsing and generating configuration commands for network devices using a grammar-based framework.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network management applications often need to determine the current configuration on a device, and then present the configuration to a user or to another process or application. Currently, two approaches are primarily used for determining a configuration. In a first approach, one or more MIB queries are issued using Simple Network Management Protocol (SNMP). An aggregation of the responses yields the then-current configuration.

Alternatively, the network management application can obtain a complete configuration file that was previously loaded into the device and process it for presentation. The configuration file typically comprises a large number of a plurality of command-line interface commands ("CLIs") that are compatible with the operating system of the network device. An example of an operating system that uses CLIs is the Internetworking Operating System of Cisco Systems, Inc. (San Jose, Calif.).

The MIB approach is easier from the perspective of the application. However, there are a number of issues with this approach. First, the development of new operating system commands and configuration parameters may occur at a pace that greatly exceeds the pace at which corresponding MIBs are developed. Typically, developing new MIBs requires extensive lead-time to allow for testing and verification. As a result, existing MIBs often are either incomplete or are not implemented in a timely manner with respect to an operating system release. This requires an application to use the configuration file to determine the device configuration. The same issues exist when an application needs to change the device configuration. MIBs also often do not distinguish between user-configured values and default values established by the operating system.

Working with a configuration file consisting of CLIs has its own set of issues. Operating system versions are released by network device vendors at a fast pace. Some vendors issue operating system versions in many version trains simultaneously. For example, in addition to major operating system releases, there may be Early Deployment (ED) releases, Technology (T) releases, and special releases for particular lines of business, business units, or customers. For each of these versions, there can be platform-specific commands and options. Further, each different release may have added or deleted certain commands, changed options for existing commands, or changed acceptable value ranges for command parameters. Support such a number of releases on an ongoing basis, through hard-coded program logic in a network management application, is a difficult task. For such support, application back ends and client code must be littered with hard coded references to the releases. Maintaining and enhancing such code is problematic.

Past efforts to tackle these issues have been unsuccessful for several reasons. Developing a general-purpose parser to handle all operating system commands is complicated when generic parsing libraries are used, such as the GNU parsing libraries. Developers of the parser must be intimately familiar with operating system command syntax. Complex trees of programmatic classes have been needed to process each operating system version, and handling platform-specific details for each version has required even more hard coding.

Further, creating a network management application that can "learn" the syntax of operating system commands programmatically, by connecting to the actual devices, is also difficult. The distributed nature of development of a complex operating system such as IOS also leads to complications.

Based on the foregoing, there is a clear need in this field for a mechanism to allow network management applications to support multiple operating system versions in which the command syntax and allowable parameter values are changing constantly.

There is a particular need for a mechanism that is flexible enough to operate with entirely new kinds of operating system command that support emerging services such as voice over Internet Protocol (VoIP).

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram illustrating an example embodiment of a CLI parser generator;

DETAILED DESCRIPTION OF THE PREFERRED EMBODIMENT

Figure 1A:
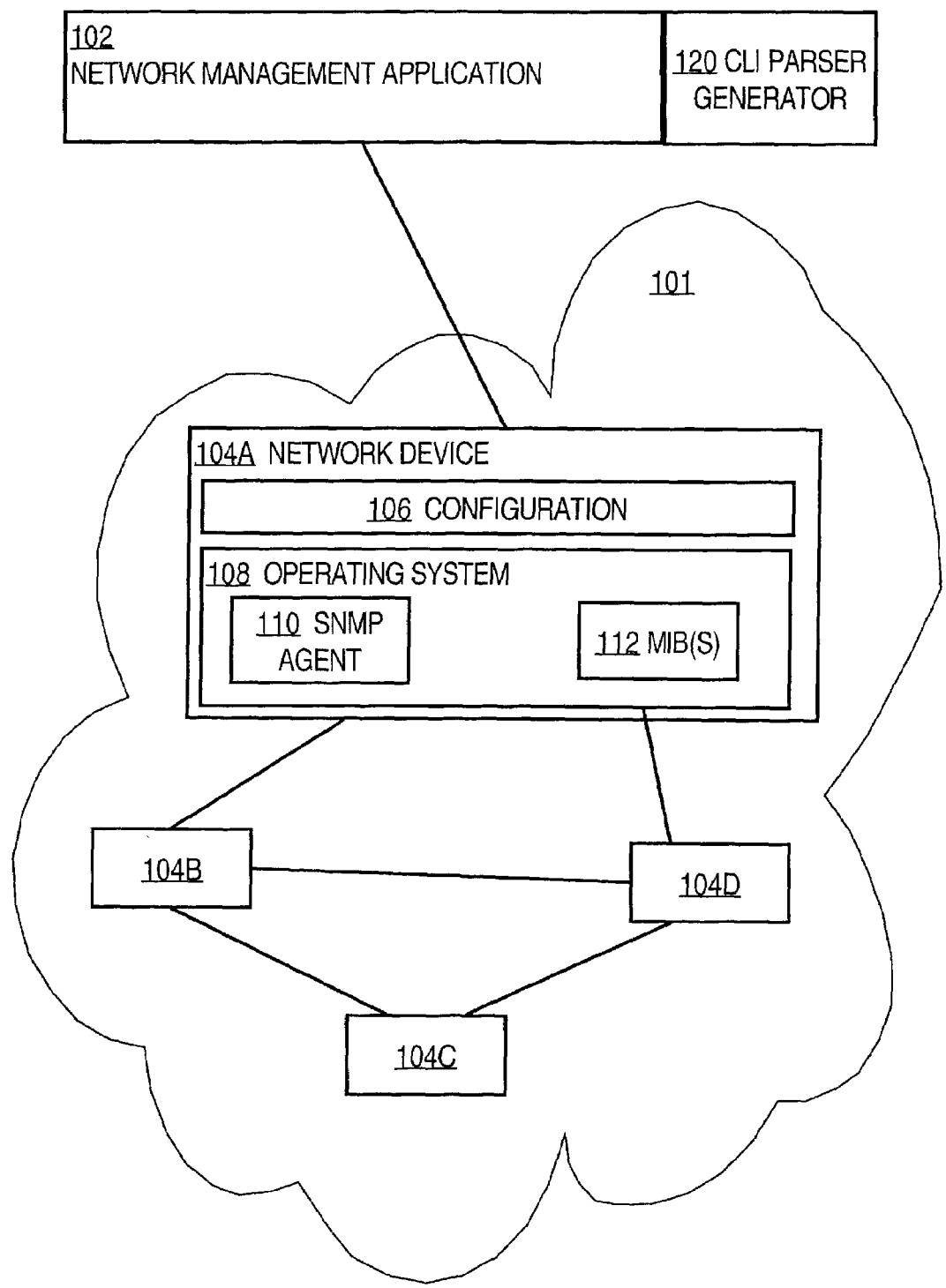
FIG. 1A is a block diagram of a hypothetical network.

A method and apparatus for parsing and generating configuration commands for network devices using a grammar-based framework is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Features of Various Embodiments
3.0 Structural and Functional Overview
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method of automatically parsing and generating one or more configuration commands for a network device that uses a command-line interface, using a grammar-based framework, is disclosed. One or more syntax definitions are received for a grammar associated with the command-line interface. The syntax definitions are compiled into a grammar object that represents the grammar. A configuration of the network device is received. The configuration is parsed using the grammar object. One or more configuration values are created and stored based on parsing the configuration. Using the configuration values, operating system version information, and the grammar object, one or more command-line interface commands may be automatically generated for use in configuring the device or other network management purposes.

In one embodiment, a CLI Parser and Generator are implemented in a software framework that offers a new, innovative, and complete solution to the problem of supporting multiple IOS versions for network management applications. Processes for parsing and building CLI commands are data-driven using predefined syntax files. All the information needed to parse CLI commands, populate the GUI, and build CLIs is centrally located. A mechanism is provided to handle a large number of IOS versions with minimal impact on code development.

In this approach, the framework is driven by a set of syntax files associated with the commands that the application needs to use. The syntax files contain information to allow the framework to parse the device configuration to determine what is configured on the device, and then to build the CLIs based on user input to actually change the device configuration. In one embodiment, the framework consists of a Grammar Builder, Grammar Locator, Configuration Parser, Value Range Builder, and CLI Builder.

The Grammar Builder reads syntax files and produces grammar objects that are then used by other components. The syntax files contains syntax information for only those commands that are of interest to the application. The framework supports an incremental change based syntax file mechanism to avoid creating too many files with very few changes. Mapping of the base and incremental syntax files to the grammar objects is specified in a properties file. A new operating system release can be supported by adding, to the mapping file, a mapping entry that specifies how the new release relates to a prior release.

The Grammar Locator module locates the appropriate grammar object based on the IOS version and device type. The grammar objects are then used to parse the configuration, to customize the GUI, to validate the user input, and to generate the CLIs. The Configuration Parser parses the device configuration file in a list of data structures, Configuration Value objects, containing key/value pairs for each command. All the keys are defined in a Java constants file used by the application. The parsing is done using the grammar object specific to the device type and IOS version.

The Value Range Builder creates a set of data structures called value range objects. The value range objects are used by the GUI to populate the fields with available options, perform range checking on numeric fields, and to enable or disable the GUI fields based on the presence/absence of the value range object for a given command parameter.

The CLI Builder component generates the IOS commands to be sent to the device using the Configuration Values objects as input. The CLIs can then be downloaded to the device using a standard Telnet/TFTP interface.

2.0 Features of Various Embodiments

In various embodiments, the approaches disclosed herein may provide numerous features and functions. Such features and functions are now described, but support for all such features and functions is not required in any particular embodiment or for the invention in its broadest form. The features and functions are highlighted to illustrate the versatility and benefits that are possible in various embodiments, but not to identify requirements or restrictions of the invention or any particular embodiment.

In one feature, the framework can parse a configuration file based on a specification of a platform version and based on platform-specific grammar objects. The grammar objects are created from syntax files containing the commands that are of interest to an application. The framework can support incremental syntax files that list only changes since the last version. This allows specifying the command syntax only once for all versions unless there is a change.

In another feature, the framework can provide grammar information to a graphical user interface (GUI) of a network management application to populate the visual controls such as combo boxes, provide range checking on numeric values, and enable or disable options as appropriate for the selected device. In another feature, the framework can generate CLIs to download to the device including "no" commands. In yet another feature, the framework can process global commands, as well as interface-level commands like gatekeeper, dial-peer, etc.

According to one feature, a framework as defined herein can read a device configuration based on the IOS version and platform-specific grammar objects, and create name-value pair objects. According to one feature, the framework handles global as well as sub-level (interface, dial-peer, etc.) commands. In another feature, the framework handles commands with nested optional/required, and/or repeat clauses. The framework may provide a way to specify common commands for multiple modes only once (VoIP, VoATM, VoFR).

According to another feature, the framework provides grammar information to the clients for customizing the GUI based on IOS version and platform. The framework may provide field enable and disable information, and field population information for use in pull down combo boxes of a GUI, as well as range checking. In other features, the framework generates CLIs to download to the device; provides add, delete, and change actions; automatically generates "fixed" keywords; generates "no" commands with partial parameters (as required by IOS); and handles single and multiple instance commands.

In still other features, the framework may supports incremental syntax files for ease of maintenance and new IOS version support; eliminates duplicating unchanged commands from version to version; and provides that a change in a base file automatically reflects in all the subsequent files.

Thus, in embodiments herein, a CLI Parser and Generator framework is entirely driven by a set of syntax files for the commands in which the application is interested. The syntax files contain enough information to allow the framework to parse the device configuration to determine what is configured on the device, and then to build CLIs based on user input for use in changing the device configuration. The framework does not contain any application-specific logic. All framework components are driven by grammar objects created form the syntax files. Any command that can be defined with grammar rules can be specified in the syntax files.

In other aspects, the invention encompasses a computer apparatus and a computer-readable medium configured to carry out the foregoing steps.

3.0 Structural and Functional Overview

To illustrate an example operating context for embodiments of the invention, FIG. 1A is a block diagram of a hypothetical network. A network management application 102 is communicatively coupled to one or more network devices 104A, 104B, 104C, 104D that form a network 101. Commercial products that can be used for network devices 104A, 104B, 104C, 104D include Cisco 2600 series routers from Cisco Systems, Inc.

Each network device hosts a configuration 106 and an operating system 108. A commercial example of operating system 108 is Internetworking Operating System (IOS) from Cisco Systems, Inc. Operating system 108 hosts or supervises an SNMP agent 110 and a management information base (MIB) 112. The SNMP agent 110 can receive and respond to SNMP protocol requests issued by network management application 102, such as requests to get or set values of objects in MIB 112.

Network management application 102 includes, or operates in association with, a CLI parser generator 120. FIG. 1B is a block diagram illustrating an example embodiment of a CLI parser generator. The CLI parser generator 120 contains 4 main modules: Grammar Builder 152, Grammar Locator 154, Configuration Parser 158, and CLI Builder 160. The Grammar Builder 152 builds grammar objects 156 using base and incremental syntax files 150A, 150B, 150C as driven by a version mapping 162. One or more Parameter Values objects 168 are associated with grammar objects 156, 156D. The Parameter Values objects 168 contain fixed information about each parameter for a command. The keys are defined in a Java constants file used by the application. Use of Parameter Values objects 168 exposes, to external applications, the parameters associated with commands defined in a command grammar, so that the external applications can use the parameters to customize a graphical user interface, perform value range checking for user data input, etc.

The Grammar Locator 152 locates a selected appropriate grammar object 156D based on an operating system version value 164 and a device type value 166.

The Configuration Parser 158 parses a device configuration file 170 into a list of Configuration Values objects 172. The CLI Builder 160 generates one or more CLI operating system commands 174 that can be sent to the device, based on a Configuration Values object 172.

In one specific embodiment, the syntax files conform to a set of grammar rules. Examples of a set of grammar rules and an associated syntax file format are provided in APPENDIX A. An example version mapping is presented in APPENDIX B.

Figure 2A:
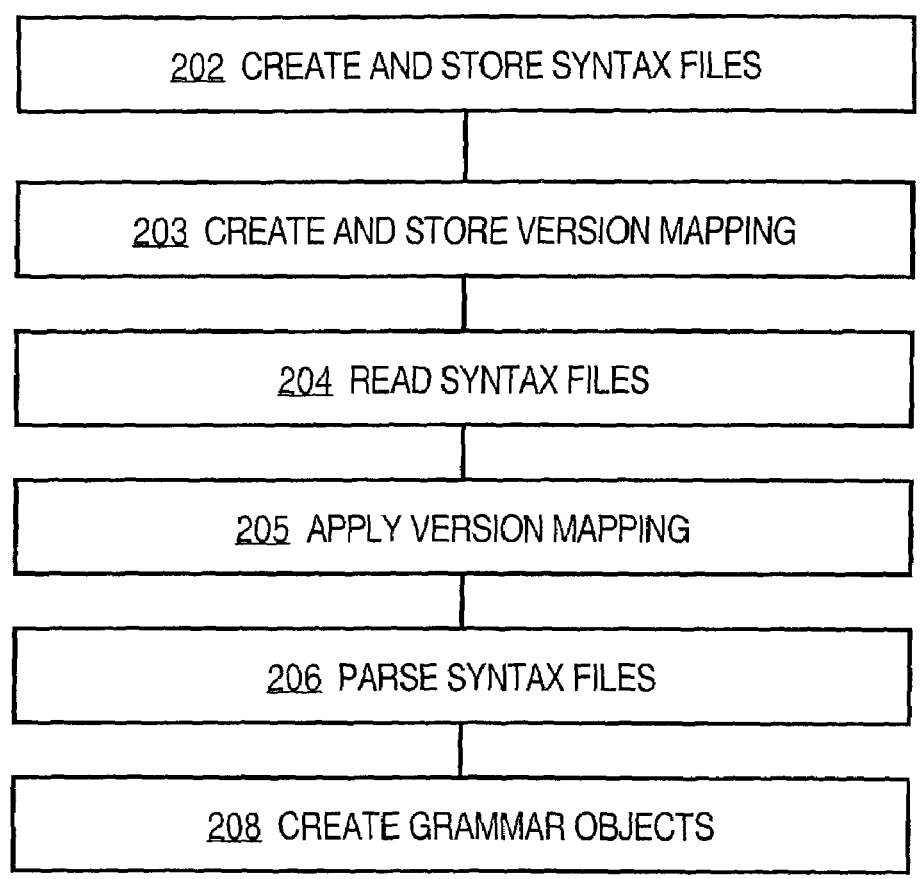
FIG. 2A is a flow diagram that illustrates a high level overview of one embodiment of a method for creating grammar objects.
Figure 2B:
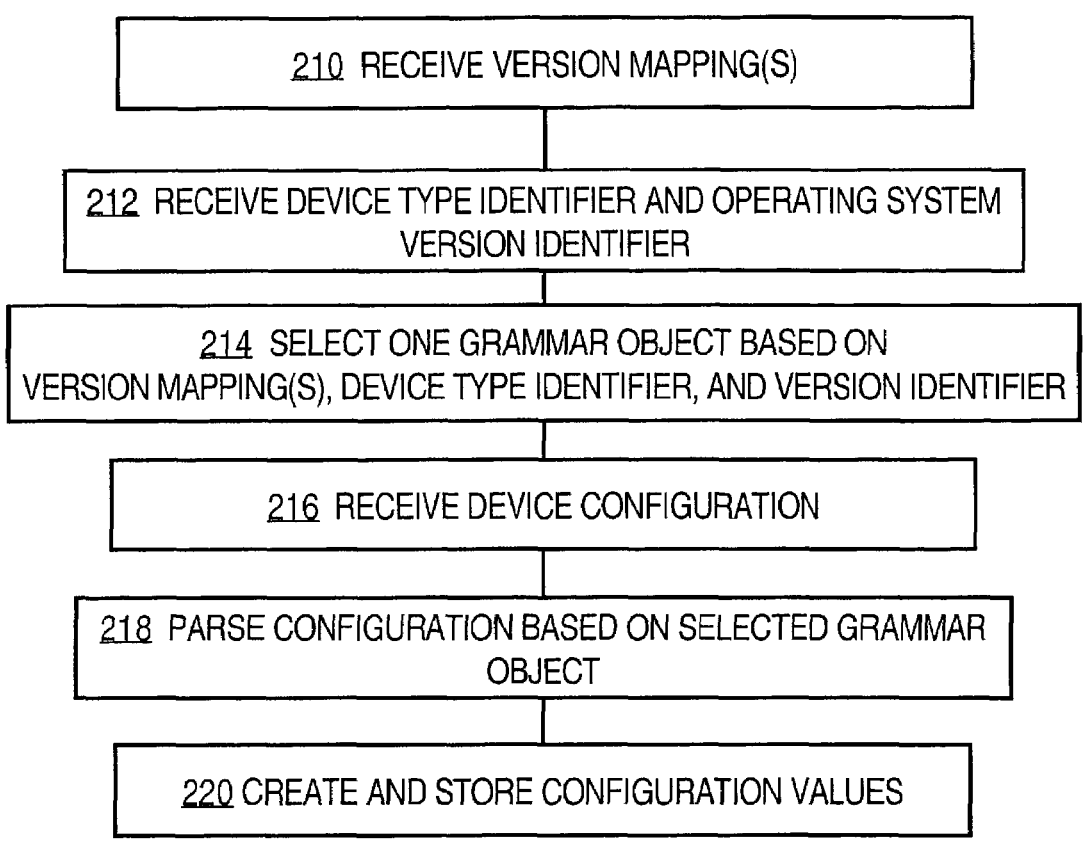
FIG. 2B is a flow diagram that illustrates a method of creating configuration values.
Figure 2C:
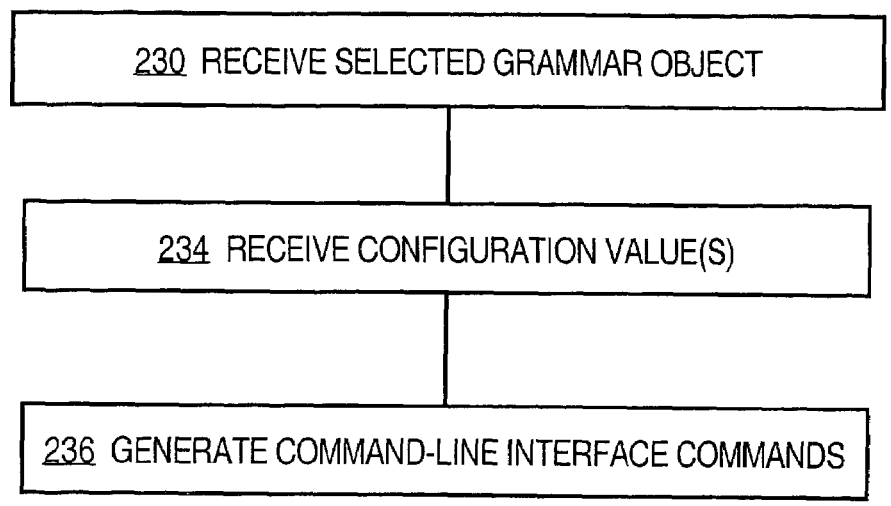
FIG. 2C is a flow diagram that illustrates a method of generating commands.

FIG. 2A is a flow diagram that illustrates a high level overview of one embodiment of a method for creating grammar objects. FIG. 2B is a flow diagram that illustrates a method of creating configuration values. FIG. 2C is a flow diagram that illustrates a method of generating commands. Thus, collectively, FIG. 2A to FIG. 2C present a high-level view of processing logic that may be used in an embodiment.

Referring first to FIG. 2A, in block 202, syntax files are created and stored. In block 203, a version mapping is created and stored. The syntax files are read in block 204, and the version mapping is applied to the syntax files in block 205. Based on reading the syntax files and applying the version mapping, the syntax files are parsed. As a result, one or more grammar objects are created in block 208. The grammar object represents a grammar for a particular version of a network device operating system and may be used in later stages to parse a configuration of the network device and to generate configuration commands.

Referring now to FIG. 2B, in block 210, one or more version mappings are received. In block 212, a device type identifier and operating system version identifier are received. For example, the device type identifier specifies the type of a network device having a configuration that is to be parsed. In block 214, a grammar object is selected based on the version mappings, the operating system version identifier, and the device type indicator. The selected grammar object is one of a plurality of grammar objects that were previously created using the process of FIG. 2A.

In block 216, a configuration of the network device is received from the device. In general, the process described herein expects to receive the device configuration in the form of a file, a vector, or a stream of commands. Other well-known mechanisms may be used to retrieve a configuration from a device and store it in a form that is usable by the framework herein. For example, SNMP queries or a TFTP file transfer may be used to obtain the then-current configuration of the device. In block 218, the configuration is parsed based on the selected grammar object. As a result, in block 220, one or more configuration values, in the form of name-value pairs, are created and stored in memory.

Referring now to FIG. 2C, which illustrates a method of generating commands, in block 230, a selected grammar object is received. Block 230 involves selecting and obtaining a grammar object that corresponds to a version of a network device operating system for which one or more configuration commands are received. In block 234, one or more configuration values are received. The configuration values are used by to generate commands. In block 236, one or more command-line interface commands are generated. The generated commands may be output to the network device, stored in a file, or passed to a network management application for other use.

Each of the components of FIG. 1B, and detailed processing steps that fall within the scope of FIGS. 2A–FIG. 2C are now described in more detail.

3.1 Grammar Builder

Grammar Builder 152 reads one or more syntax files 150A, 150B, 150C and produces one or more grammar objects 156, 156D that are then used by other components. The syntax files 150A, 150B, 150C contain syntax information for only those commands that are of interest to the application. Components of CLI parser generator 120 support the use of syntax files that specify incremental changes, so that an administrator avoids creating too many files with very few changes. Version mapping 162 specifies a mapping of one or more syntax files, which may include base syntax files or incremental syntax files, to the grammar objects 156. Version mapping 162 also allows CLI parser generator 120 to support new operating system versions that are released after an instance of CLI parser generator 120 is installed.

In one embodiment, all syntax files 150A, 150B, 150C and grammar objects 156 are stored in one directory. A consistent file naming convention may be used, such as the following:

Syntax file: <ios version>[-<device type>].txt
Examples: 12.1(3a)T-5xxx.txt, 12.2.1.txt
Grammar object: <ios version>[-<device type>].ser
Examples: 12.1(3a)T-5xxx.ser, 12.2.1.ser CLI parser generator 120 typically operates properly on when syntax files 150A, 150B, 150C contain correct and up-to-date information. Such syntax files can be created using online operating system documentation or using a "help" mode provided by the network devices. Syntax files are updated based on new documentation or because of the product testing activities.

For each IOS version, platform specific incremental syntax files can also be created.

Version mapping 162 specifies one or more mappings of one or more syntax files to grammar objects. In one embodiment, version mapping 162 contains one or more of three (3) types of statements.

1. Grammar object based on a single syntax file. A first form of statement is used to create a base grammar object. This grammar object plus an incremental syntax file would create new grammar objects.

Example: 12.1(2)T=12.1(2)T

This means that 12.1(2)T.ser grammar object is built from 12.1(2)T.txt syntax file.

2. Grammar object based on an existing grammar object plus an incremental syntax file.

Example: 12.1(3a)T=12.1(2)T, 12.1(3a)T

Here a 12.1(3a)T.ser object would be constructed using an existing grammar object, 12.1(2)T, plus the changes described in the syntax file 12.1(3a)T.txt.

3. Grammar object based solely on an existing grammar object

Example: 12.1(3)T=12.1(3a)T

This statement instructs the Grammar Builder 152 not to create a new grammar object file since 12.1(3)T is identical to the existing 12.1(3a)T grammar object. The Grammar Locator 154 uses this information to return the existing 12.1(3a)T.ser grammar object when the requested operating system version is 12.1(3)T. This helps reduce the need to create unnecessary files that have the same content.

Figure 3A:
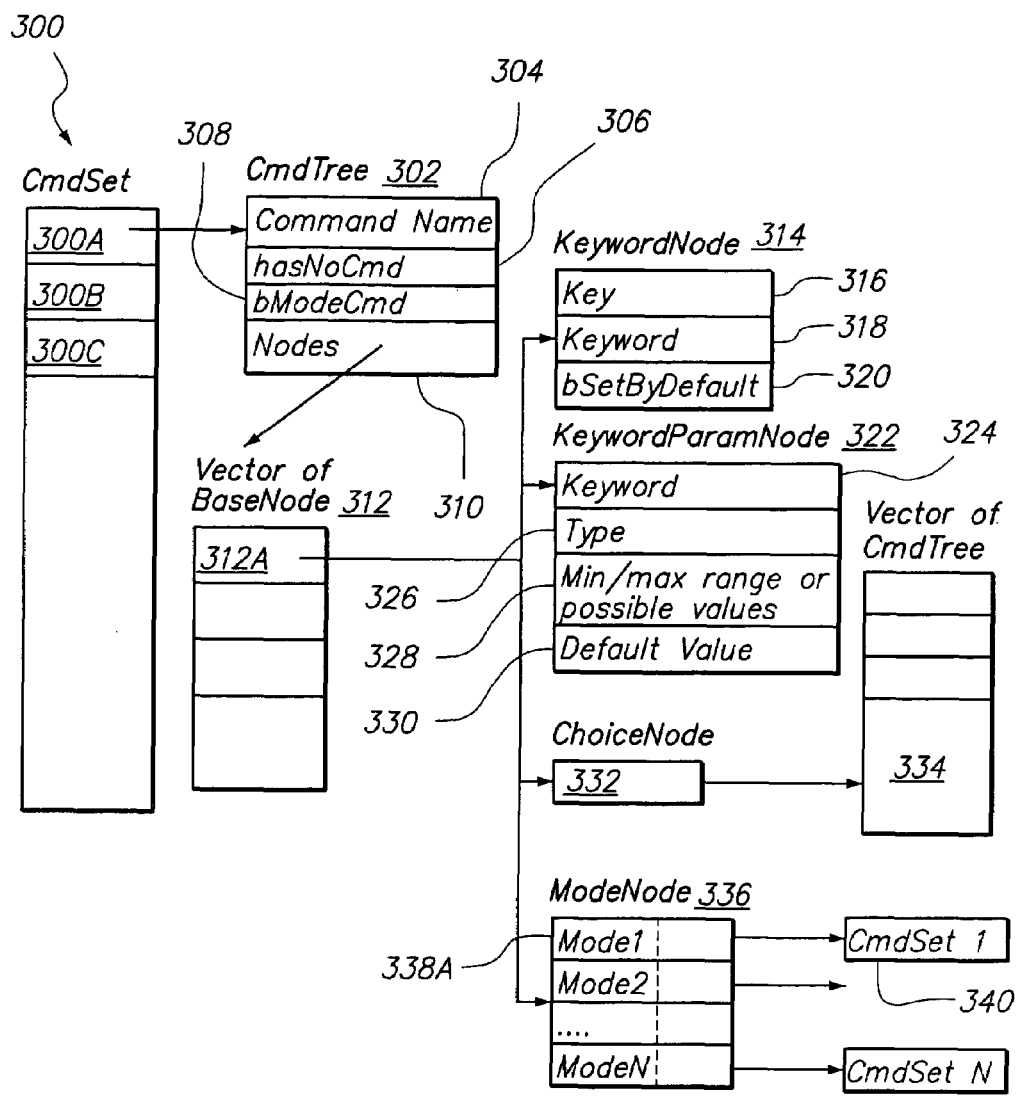
FIG. 3A is a block diagram of a grammar object, according to one embodiment.

FIG. 3A is a block diagram of a grammar object, according to one embodiment. In this embodiment, grammar objects 300 are serialized Java® objects of the type CmdSet. Each CmdSet object 300A, 300B, 300C is a vector of CmdTree objects 302. Each CmdTree object 302 contains information about each command instance as specified in the syntax file. In one specific embodiment, each CmdTree object 302 comprises a command name 304, a first flag 306 indicating whether the command has a "no" mode, a second flag 308 indicating whether the command has a "default" mode, and reference 310 to a vector of BaseNode objects 312.

According to one embodiment, each element 312A, 312B, 312C of vector 312 can comprise a Keyword Node 314, a Keyword Parameter Node 322, a Choice Node 332, or a Mode Node 336. A Keyword Node 314 represents a simple fixed keyword node, and comprises a Key value 316 consisting of an application-specified identifier or name for the configuration value, a Keyword value 318 that specifies the keyword, and a Boolean value 320 indicating whether the command is set by default.

A Keyword Parameter Node 322 represents a numeric or string parameter. In one embodiment, a Keyword Parameter Node 322 comprises a keyword value 324, type value 326, possible values 328, and default value 330. The keyword value 324 gives the value of a fixed keyword. The type value 326 specifies a type of the parameter, such as numeric, string, enumeration, etc. The possible values 328 specify a minimum and maximum range for the parameter, if appropriate, or one or more possible values that the parameter can take on. The default value 330 specifies a default value that is applied to the parameter.

A Choice Node 332 represents a choice clause, in which each clause is represented by a CmdTree object 302, as indicated by vector 334. A Mode Node 336 represents a mode node for "mode" commands, and comprises one or more elements 338A, 338B, etc. respectively associated with each of the modes of a command. For example, if a CmdTree node 302 represents an 'interface' command, then the elements 338A, 338B, etc. of a Mode Node 336 may be 'Ethernet', 'Serial', 'FastEthernet' etc. For each mode, a corresponding CmdSet object 340 holds all the commands for that mode.

Figure 3B:
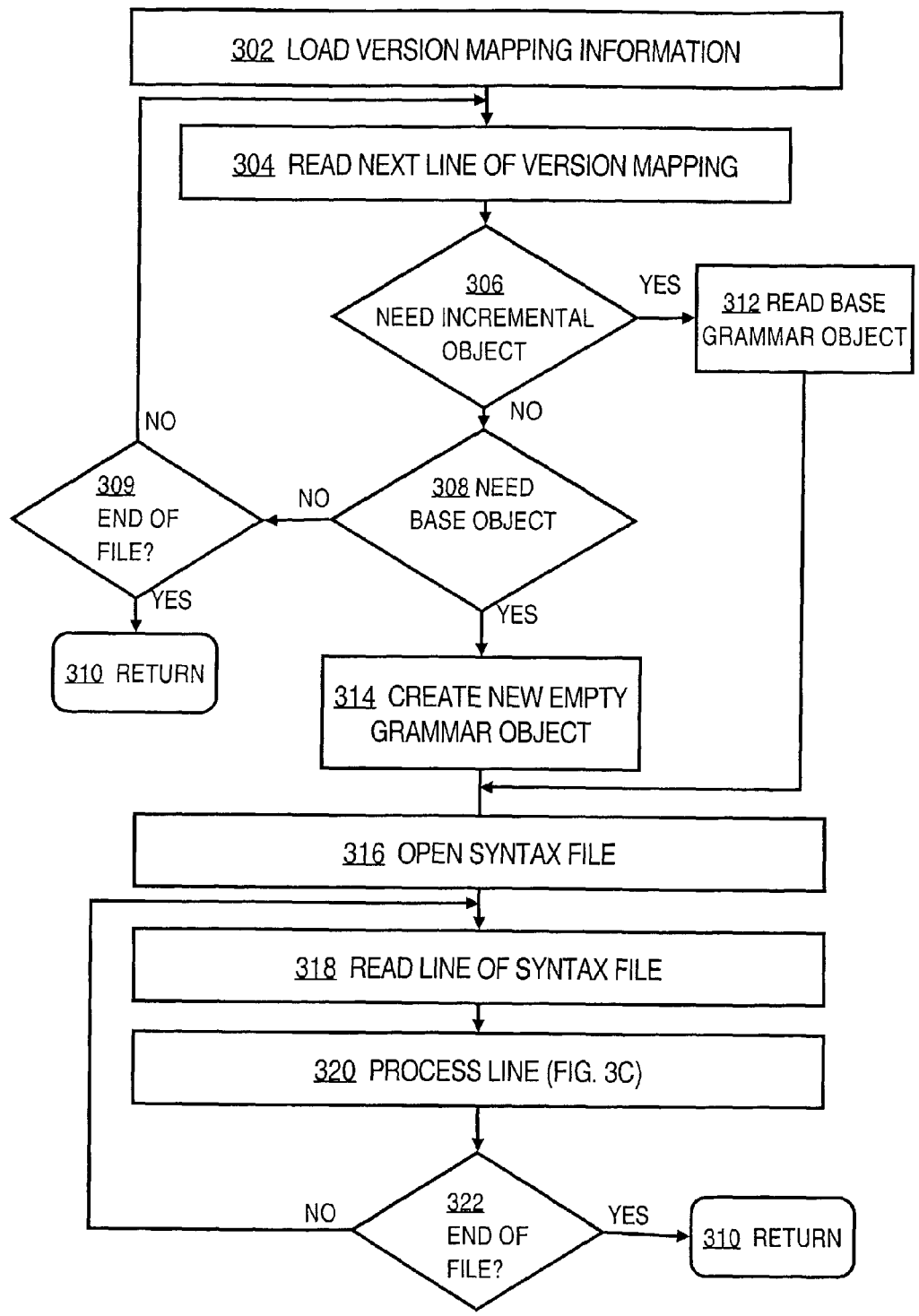
FIG. 3B is a flow diagram illustrating high-level logic that may be implemented by Grammar Builder 152, in an example embodiment.

FIG. 3B is a flow diagram illustrating high-level logic that may be implemented by Grammar Builder 152, in an example embodiment.

In step 302, version-mapping information is loaded. For example, Grammar Builder 152 opens version mapping 162, which may be a text file, or another form of storage. In block 304, the next line of the version mapping is loaded. In block 306, the Grammar Builder tests whether the version mapping specifies creating an incremental grammar object. If so, then in block 312, the base grammar object is read from which an incremental object will be created.

Otherwise, in block 308, the Grammar Builder determines whether a base object needs to be created. If a base object is needed, then in block 314 an empty grammar object is created.

In block 309, a test is performed to determine whether the end of the version mapping has been reached. If so, then control passes to block 310 in which the Grammar Builder returns control or terminates processing. If not, then control passes to block 304, in which the next line of the version mapping is read. In this way, blocks 306, 308, 312, 314, and 309 iterate until the entire version mapping is processed.

In block 316, a syntax file is opened. The syntax file may be that specified in a version mapping. In block 318, the next line is read from the syntax file. The line is processed in block 320 according to the process of FIG. 3C, which is described further below. In block 322, a test is performed to determine if the end of file has been reached. If so, then control passes to block 310; otherwise, control passes to block 318 in which the next line is read for processing.

Figure 3C:
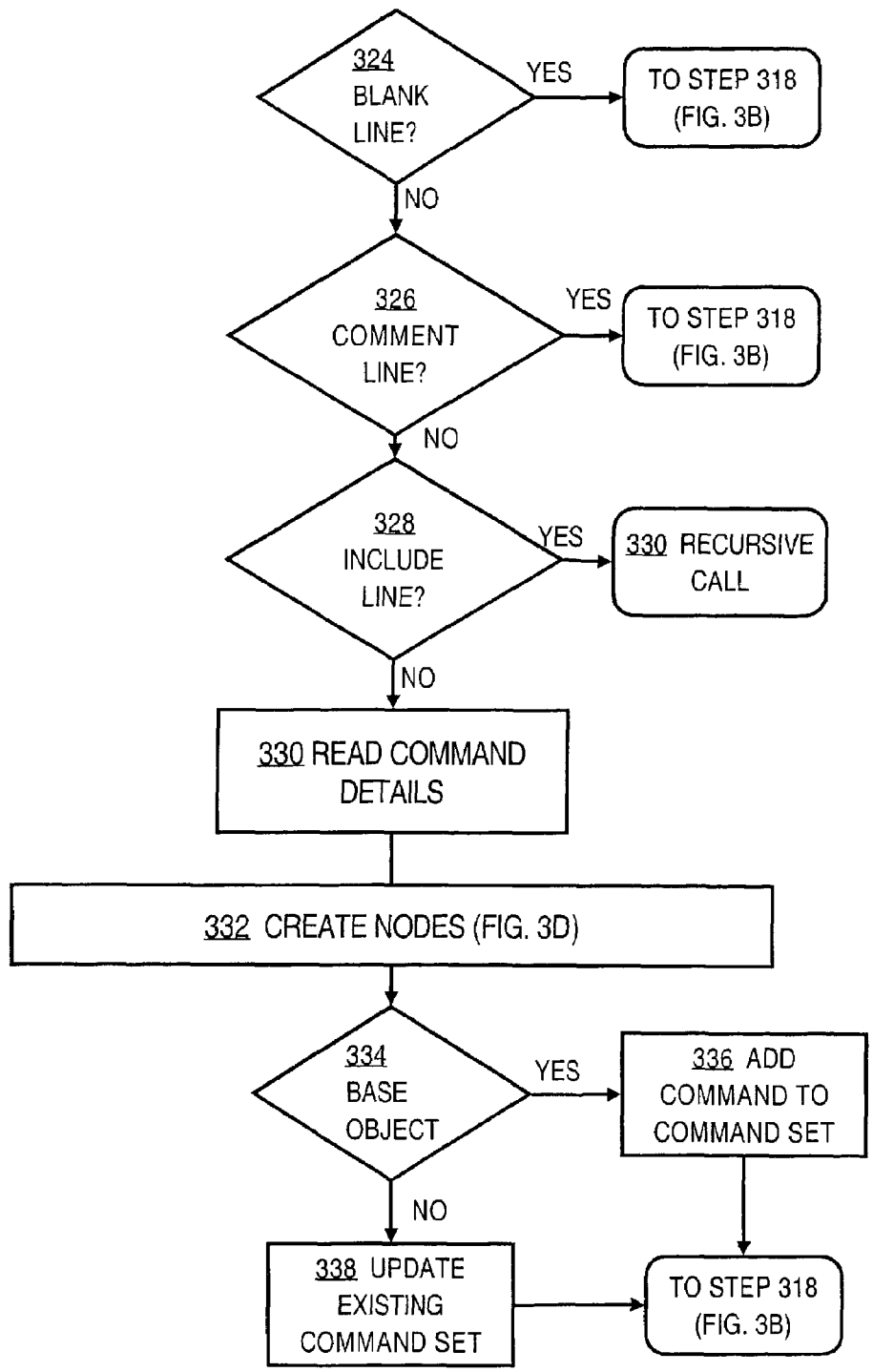
FIG. 3C is a flow diagram of a method for processing a line from a syntax file.

FIG. 3C is a flow diagram of a method for processing a line from a syntax file. In block 324, a test is performed to determine whether the current line comprises a blank line. If so, then control passes to step 318 of FIG. 3B, which effectively skips the blank line. In block 326, a test is performed to determine whether the current line comprises a comment line. If so, then control passes to step 318 of FIG. 3B, which effectively skips the comment line.

In block 328, a test is performed to determine whether the current line comprises an "include", which may be designated by the text '#include'. If so, then in block 330 a recursive call to the Grammar Builder is made to process the nested syntax file identified in the "include" line. Nested include files are handled in a recursive manner rather than having to preprocess the file or to create temporary files. This makes it possible to have #include files to be nested to an arbitrary depth, as well fully reusing the existing code.

In block 330, certain command details are read. In one embodiment, block 330 involves reading whether the current command is a mode command, whether the command is a single or multiple instance type, which may be designated in the syntax file line by a "no" or "no_m" string, and reading the command name. In block 332, one or more nodes are created to represent the syntactic structure of the command, as set forth in the process of FIG. 3D, which is described further below.

After the nodes are created, they are added to the grammar object (e.g., command set data structure). If the current grammar object is a base object, as tested in block 334, the current command is added to the command set. Alternatively, for an incremental object, as indicated by block 338, the existing command set is updated with the new command definition. Control then passes to step 318 of FIG. 3B to process the next line of the syntax file.

Figure 3D:
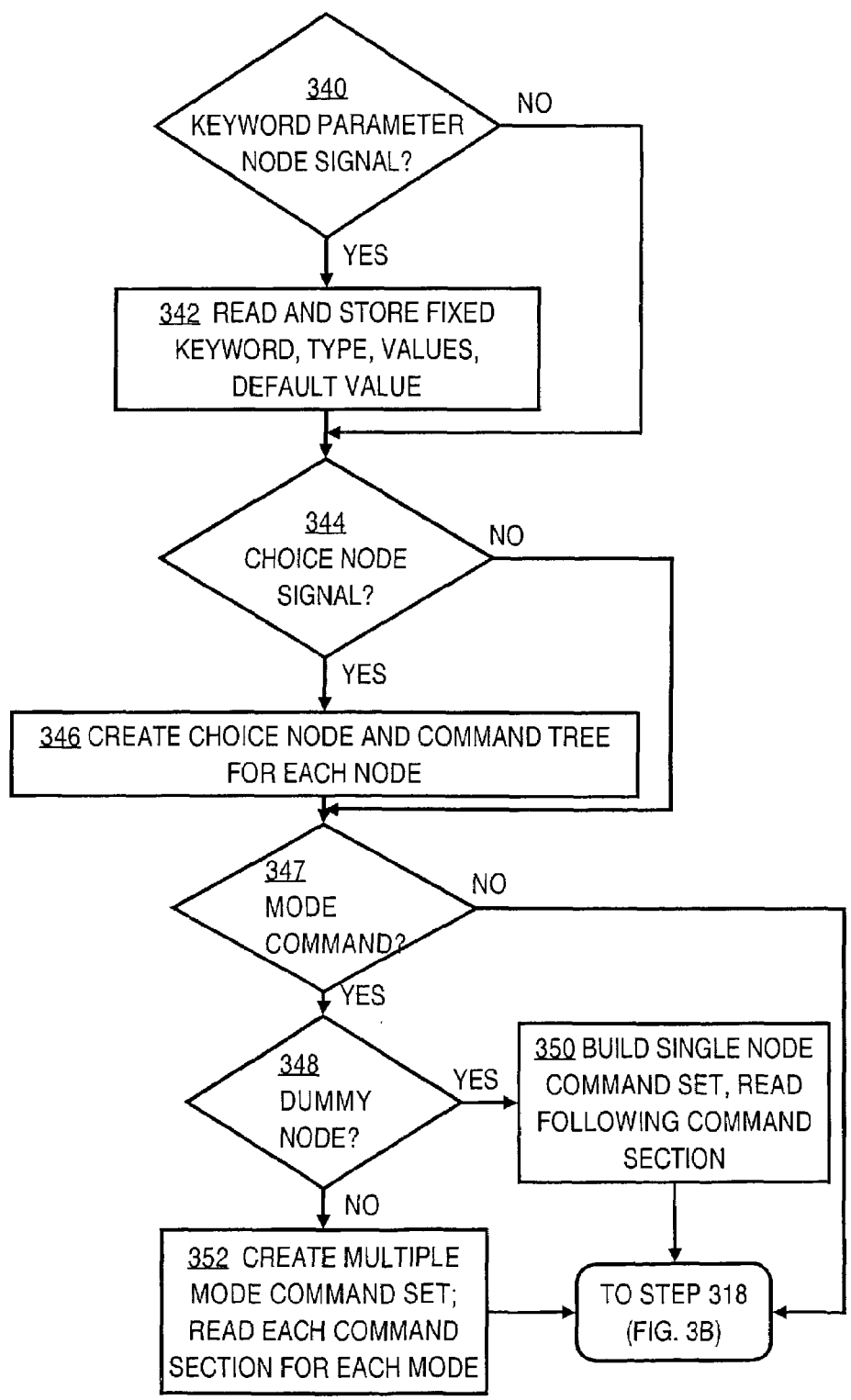
FIG. 3D is a flow diagram of a process for creating nodes representing a command.

FIG. 3D is a flow diagram of a process for creating nodes representing a command. In block 340, a test is performed to determine whether the current line contains a signal identifying a keyword parameter. For example, in one embodiment, if the character "(" is identified in the current line, then in block 342, a keyword parameter node is created. In addition, the fixed keyword is read from the line if present and stored, the type (e.g., int, string, etc.) is read and stored, the minimum and maximum values or other possible values are read and stored, and the default value of the parameter is read and stored.

In block 344, a test is performed to identify whether a choice node signal appears in the current line. For example, in one embodiment, if the character "[" or "{" is identified, then a choice node is created. Further, for each choice, a command tree is created, albeit without the command name.

In block 347, a test is performed to determine whether the current line identifies a mode command. If not, then control passes to step 318 of FIG. 3B to process the next line of the syntax file.

Some mode commands have a parameter whose value determines the sub mode commands. This parameter is stored in the command tree as a 'mode' node. However, some mode commands don't have such a parameter. This is referred to as a fixed or simple mode command. To handle this command as similar to the command with mode parameter, a dummy mode node is created in the command tree. Having a dummy mode node for such commands allows the system to have one set of code to handle both types of commands. Accordingly, if a mode command is identified, then in block 348 a test is performed to determine whether the mode is set to "dummy." If so, then in block 350, a single mode command set is created, and the following command section is read and processed. Alternatively, in block 352, multiple mode command sets are created, and each command section for each mode is read. A command set is created for each mode.

The Grammar Builder 152 supports building grammar objects using syntax files that only describe changes to an existing grammar object. The incremental file may contain changes for a newer version, or changes for a specific platform for the same version. The incremental file support is provided in a nested manner. For example, grammar object for version1 can act as a base of version2, and version2 grammar object would be the base for version3, and so on. So the grammar object for version N would comprise of version1 plus changes in version 2 plus changes in verison3 to all the way up to changes in version N.

In one embodiment, the logical process described in Table 1 is followed for updating a command set:

TABLE 1

UPDATING A COMMAND SET

For each command tree in a command set
    Update each command tree
        Get existing command trees for the command name
        If none, then simply add the command tree to the command set.
        Otherwise, find the existing command tree with matching
        next token
            If no match is found,
                Add the command tree to the command set
            Otherwise if command is to be deleted
                Delete the command tree from the command set
            Otherwise
                Update the existing command tree with the new one The logical process described in Table 2 may be followed for updating a command tree:

TABLE 2

UPDATING A COMMAND TREE

If it's not a mode command
    Just replace all the nodes
Otherwise,
    Save the existing mode node
    Update the saved (old) mode node with new
    Put back the saved mode node in the existing nodes vector Further, the logical process described in Table 3 may be followed for finding a matching command tree:

TABLE 3

FINDING A MATCHING COMMAND TREE

If existing command trees == 1 AND command has no nodes
    Return this command tree
For each tree in the existing command trees,
    Match the 1$^{st}$ keyword
        For a keyword node, just match the keyword
            If match, add tree to matching tree vector
        For a keyword parameter node, match the keyword if present
            If match, add tree to matching tree vector
        For a mode node, match the parameter key
            If match, add tree to matching tree vector
If number of matching trees = 0 OR > 1
    Return ERROR
Otherwise, return the command tree.

The logical process described in Table 4 may be followed for updating a mode node.

TABLE 4

UPDATING A MODE NODE

For each mode in the new node
    If mode doesn't have any associated command set
        Do nothing since this mode is unchanged
    Otherwise if this mode doesn't exist in the existing node
        Add this mode and its command set
    Otherwise
        Update the existing command set with this new command set

3.2 Grammar Locator

Grammar Locator 154 is used to locate the grammar object for a given operating system version and device type. The Value Range Builder, Configuration Parser 158 and CLI Builder 160 use Grammar Locator 154. In one embodiment, Grammar Locator 154 uses the version mapping 162, version value 164, device type value 166, and the logical process shown in Table 5 to map a given operating system version and device type to the grammar object.

TABLE 5

GRAMMAR LOCATOR PROCESS

1. Remove any vendor identifier, if present, from the device type value. For example, a device type value of "Cisco7200" is changed to "7200."
2. Remove the last character of the operating system version value if it ends in a digit, when that digit signifies that a release with minor big fixes. For example, a version value of "12.1(3)T3" is changed to "12.1.(3)T."
3. Determine if the operating system version value contains a specific device type value, and if so, check if a grammar object exists that exactly matches the specific operating system version and device type. For example, if the operating system version value is "12.1(3)T-5300," check whether a grammar object exists having a name exactly matching that value.
4. Determine whether an existing grammar object has a name associated with a base version matching the operating system version value. For example, if the operating system version value is "12.1(3)T," determine whether there is an existing grammar object for a base version such as "12.1(3a)T."
5. Find all existing grammar objects having names in which the operating system version value matches the required version. If the current operating system version value is a platform specific entry, then perform a wild card match for the platforms. For example, if the operating system version value is "12.1(3a)T-5xxx," try to find existing grammar objects that match the value "5xxx" and the given platform.
6. If no platform specific match is found, then return the base version object.
7. If no match is found at all, then determine the following. If the operating system version is more recent (larger) then the maximum supported version, return the maximum version object. If the operating system version is between the minimum and maximum version, return the minimum version object. If the operating system version is older than the minimum supported version, return ERROR.

3.3 Configuration Parser

Configuration Parser 158 parses a configuration file for a specified operating system version and device type. Grammar Locator 154 is used to find the appropriate grammar object. Parsing is done for only those commands that are contained in the grammar object. In one embodiment, Configuration Parser 158 may receive a configuration in one of three ways. First, the configuration file may comprise a file containing configuration commands; second, another process may pass Configuration Parser 158 a Java® vector of configuration commands; or Configuration Parser 158 may receive an input stream of configuration commands.

Figure 4:
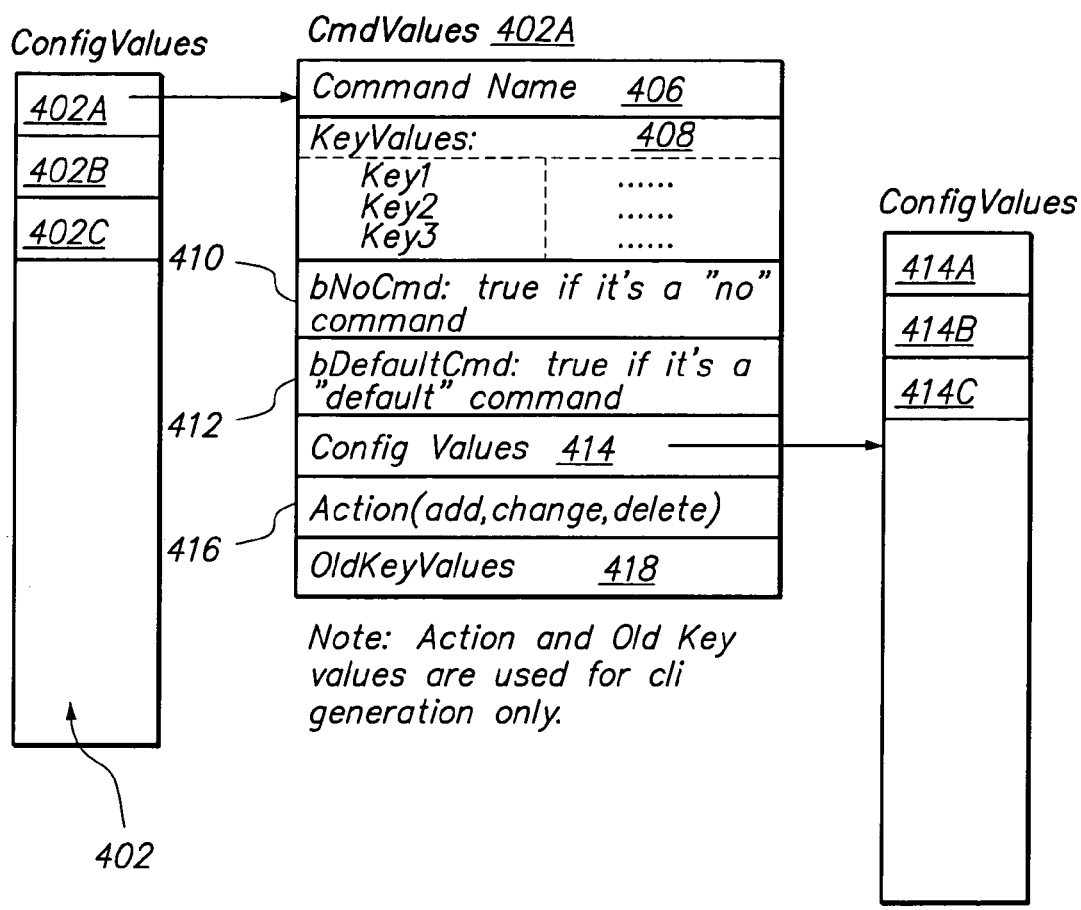
FIG. 4 is a block diagram of data structures that may be output from a configuration parser.

Further, in one embodiment, the output of the Configuration Parser 158 is a vector of Config Values objects. FIG. 4 is a block diagram of Configuration Parser output. The output comprises a Config Values vector 400 comprising one or more Command Values objects 402A, 402B, 402C, in which each of the Command Values objects is associated with a top-level command. Examples of top level or global commands are "gatekeeper," "dial-peer," "interface," etc.

Each of the Command Values objects consists of a plurality of data elements, as shown in FIG. 4 for Command Values object 402A. In one embodiment, a Command Values object 402A comprises a command name 406, a Boolean No Command flag 410, a Boolean Default flag 412, a Key Values set 408, an Action value 416, and an Old Key Values set 418.

The Boolean No Command flag 410 indicates whether the associated command is a "no" command. The Boolean Default flag 412 indicates whether the associated command is a "default" command. Special processing for such commands is described further below.

The Key Values set 408 comprises one or more key/value pairs for the associated command, and may be organized as a hash table. The Action value 416 specifies an action to be performed in generating CLI text, and in one embodiment, can be Add, Delete, or Modify. The Old Key Values set 418 comprises one or more old key/value pairs for the associated command, and may be organized as a hash table. The Old Key Values set 418 is used to generate the "no" commands for the modify action.

If the associated command is an interface or mode command, then the Command Values object 402A further comprises a Config Values object 414 that stores information representing the sub commands associated with the command.

If parsing a particular command in the configuration file results in a syntax error, the associated command is stored in a Command Values object 404 but identified as an "extra" command. This enables later display of the "extra" commands to the user in a free format window. This allows the parser to be "future proof" in that it can "handle" commands whose syntax has changed since application release, and provides robust processing for situations where the syntax file itself contains an error.

Figure 5A:
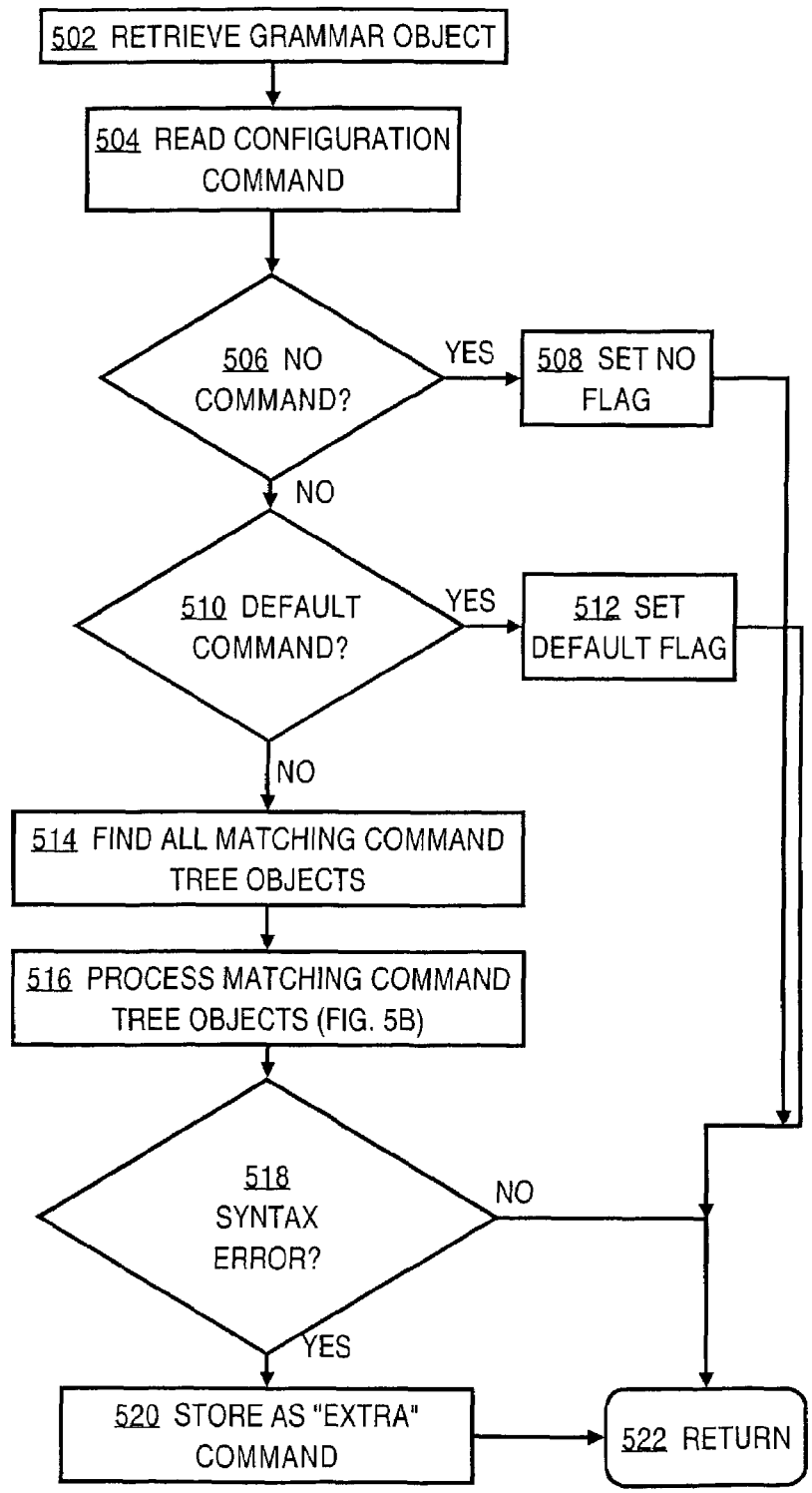
FIG. 5A is a flow diagram that illustrates one embodiment of processing logic for the Configuration Parser.

FIG. 5A is a flow diagram that illustrates one embodiment of processing logic for the Configuration Parser. In block 502, a grammar object is retrieved. For example, the Grammar Locator is invoked to obtain an appropriate grammar object for the given operating system version and device type.

In block 504, a configuration command is read. In block 506, a test is performed to determine whether the configuration command is a 'no' command. If so, then it is marked as such a command, as shown by block 508. For example, marking may comprise setting the Boolean No Command value to TRUE in the Command Values object 402A. In block 510, a test is performed to determine whether the configuration is a 'default' command. If so, then it is marked as such a command, as indicated by block 512. For example, marking may comprise setting the Boolean Default Command value in the Command Values.

In block 514, a search is performed to locate all matching Command Tree objects 302 (FIG. 3A) associated with the then-current command name. Each matching Command Tree object is then processed, as indicated by block 516, using a process that is described further herein with respect to FIG. 5B. If parsing is not successful for any of the command trees, then the command is added to the Command Values object as an Extra Command. Thus, in block 518, a test is performed to determine whether a syntax error occurred during parsing as part of block 516. If so, then the current command is stored as an "extra" command, in block 522. Thereafter, or if no syntax error occurred, control returns, as indicated by block 522.

Figure 5B:
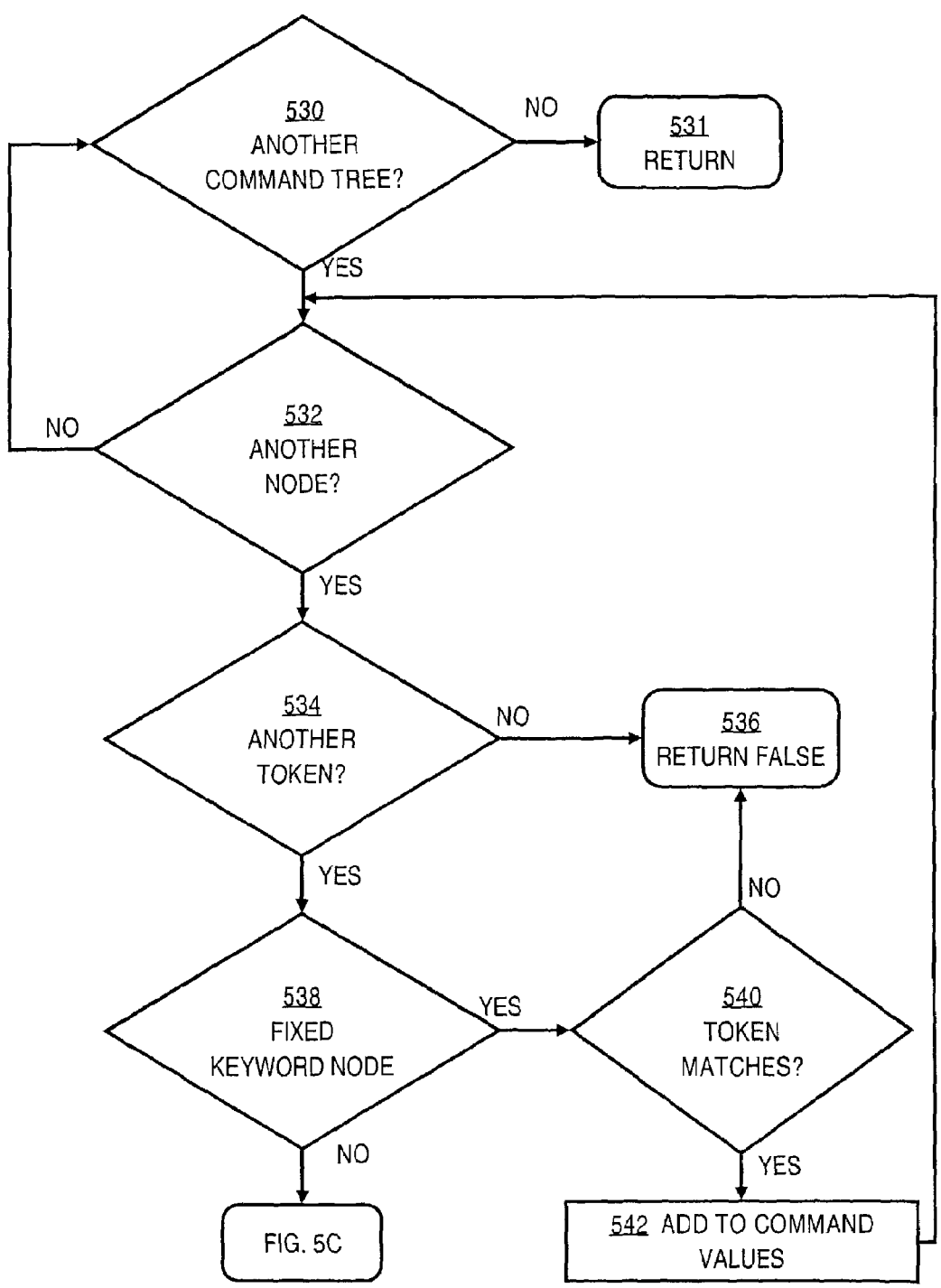
FIG. 5B, FIG. 5C, and FIG. 5D are flow diagrams of a method of processing command trees, according to one embodiment.
Figure 5C:
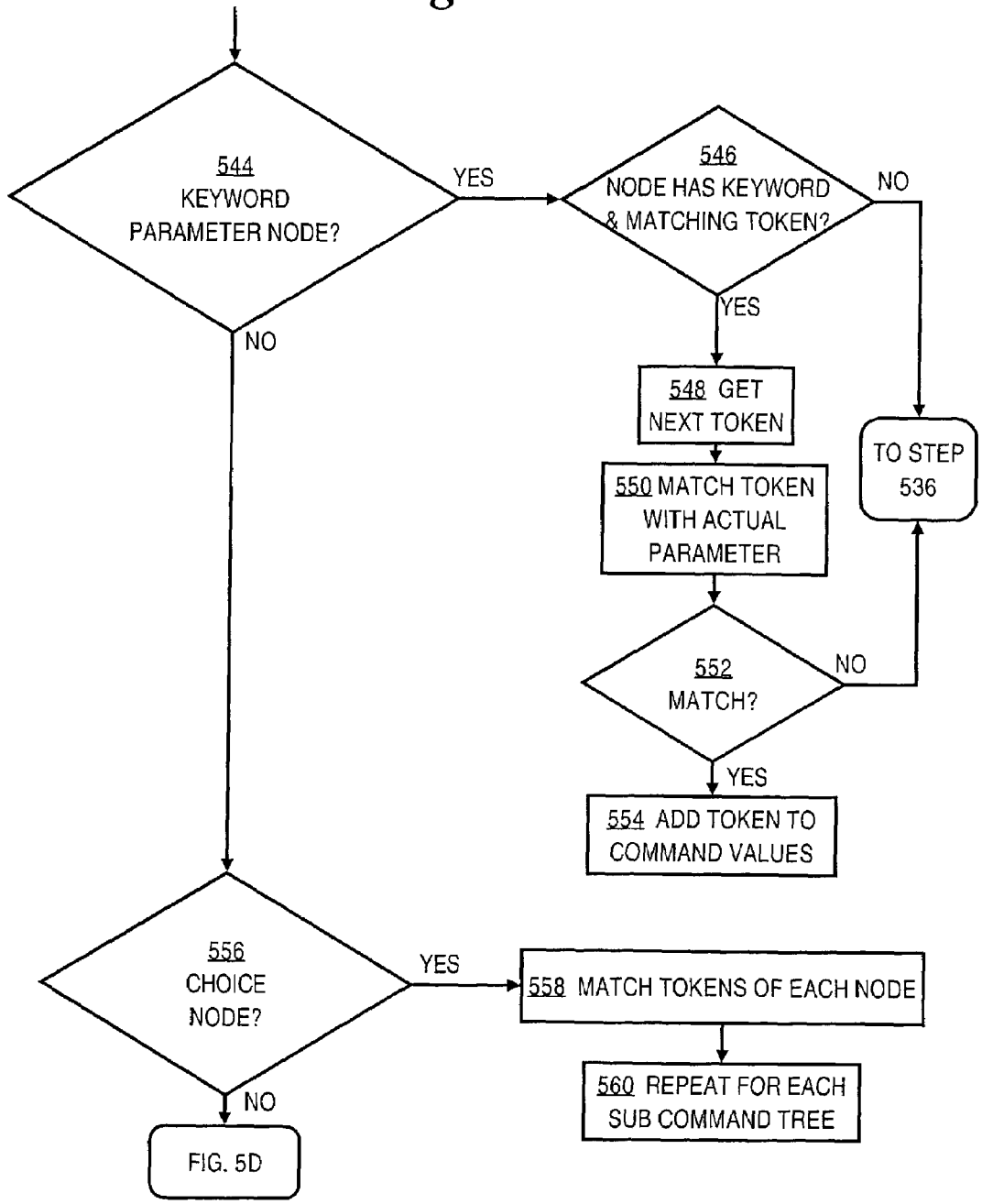
Figure 5D:
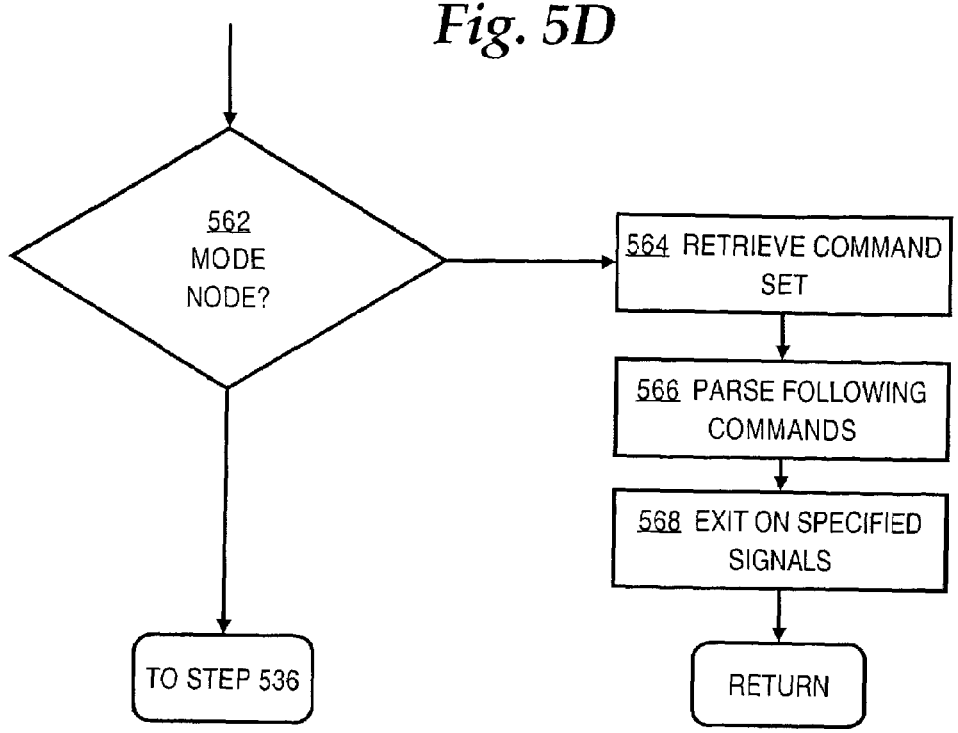

FIG. 5B, FIG. 5C, and FIG. 5D are flow diagrams of a method of processing command trees, according to one embodiment. Referring first to FIG. 5B, in general, the process of FIG. 5B is iterated for each node in each matching command tree. Accordingly, in block 530, a test is performed to determine if the current command has another matching command tree. If not, then processing for the command is complete and control returns, as indicated by block 531. If a command tree exists, then control passes to block 532, in which a test is performed to determine if an additional node in the tree exists. If not, then control passes to block 530 to iterate.

If a node is found, then in block 534 a test is performed to identify a next token from the command. Block 534 also involves temporarily storing the next token that is recognized. If there are no more tokens, and required nodes remain present in the command tree, then a false result is returned, as indicated by block 536. Otherwise, control passes to block 538 to begin a sub-process to determine what kind of node is present, and to process it appropriately.

In block 538, a test is performed to determine whether the current node is a fixed keyword node. If so, in block 540 a test is performed to determine whether the token matches the fixed keyword. If so, then the token is added to the Command Values data structure, as shown in block 542. If there is match and the current node is required node, then a false result is returned.

Referring now to FIG. 5C, in block 544, a test is performed to determine whether the current node is a keyword parameter node. If so, then in block 546 a test is performed to determine whether the node has a keyword, and the token matches the keyword. If the node has a keyword, and the token matches the keyword, then in block 548 the next token is identified and temporarily stored. As shown in block 550 and block 552, an attempt is made to match the token with the actual parameter. If the token does not match the keyword and it is required, then a false result is returned by passing control to block 536. If a match is made, then the token is added to the Command Values data structure.

In block 556, a test is made to determine whether the node is a choice node. If so, then in block 558 for each node of each sub command tree in the choice node, the next token is matched using the logic described above and shown in FIG. 5C for the keyword parameter node. If there is no match and the choice node is required, then a false result is returned.

Referring now to FIG. 5D, in block 562 a test is performed to determine whether the current node is a mode node. If so, then in block 564, the command set for the mode specified in the command is retrieved. In block 566, recursively, the following commands are parsed using the new command set and the logic described above for the keyword parameter node. Parsing terminates, as specified in block 588, if either a "!" symbol is encountered, or the indentation level of the new line is less than the current line. These conditions signify the end of a "mode" section of the file.

In some cases commands start with the "no" or "default" keyword. These commands have the following syntax:
[no/default]<cmdname>[parameter 1] [Parameter 2] . . .

For example:
no shutdown
default ????

Configuration Parser 158 parses these commands like the normal commands (without "no" or "default" keyword in the beginning) with the following difference:
1. Appropriate Boolean (bNoCmd or bDefaultCmd) is set in the CmdValues data structure.
2. The parser does not insist on all the required parameters to be present.

In one embodiment, Configuration Parser 158 is accessible programmatically using application programming interfaces having the following form:

public ConfigParser(String iosVersion, String deviceType)

public ConfigParser(CmdSet cmdSet)

public ConfigValues getConfigValues(Vector configCmds) throws CliGPBException public ConfigValues getConfigValues(String configFile) throws CliGPBException public ConfigValues getConfigValues(InoutStream configStream) throws CliGPBException 3.4 Command-Line Interface Command Builder CLI Builder 160 generates one or more operating system commands based on a list of Config Values objects 172. CLI Builder 160 uses the Grammar Locator 154 to find the appropriate grammar object for a given operating system version and device type. Commands are generated in the order that Config Values appear in the list. CLI text strings are generated based on the value of the action parameter of each Command Value object.

CLI Builder 160 may perform an Add action, Delete action, or Modify action. An Add action causes CLI Builder 160 to generate a normal CLI text string. In a Delete action, a "no" command is generated with only information that's needed for the "no" command. These details are hidden from the user of CLI Builder 160. The command parameters that form a part of the "no" command are specified in the syntax file.

A Modify action modifies an existing command. To modify an existing command, CLI Builder 160 uses one of two processes, depending whether the command is a "single" or "multiple" type of command. Some CLI commands can be issued only once, such as the "session target" command. Issuing the command again with new values replaces the first set of values. To change such a single type of command, there is no need to generate a "no" command. In contrast, some commands can be issued multiple times, like the "zone remote" command. In the case of such a multiple command, a second "zone remote" command does not replace the first one; the second command is added to the existing commands. Therefore, to change this type of command, a "no" command followed by a regular command is generated automatically without involving the user of CLI Builder 160. The syntax file specifies whether a particular command is a single or multiple instance command.

In one embodiment, CLI Builder 160 generates all the "no" commands before any regular command. Once the "no" commands are generated, the remaining commands appear in the order they are listed in the Config Values vector. In this embodiment, CLI Builder 160 clients can populate the Config Values vector without placing all commands that require a "Delete" action first.

To generate a sub mode command, the Config Values must contain the parent "mode" command with the Add action before the actual sub mode command. This is true whether the sub mode command needs to be added, changed or deleted. Deleting a mode command automatically deletes ("removes") all its sub mode commands.

Figure 6A:
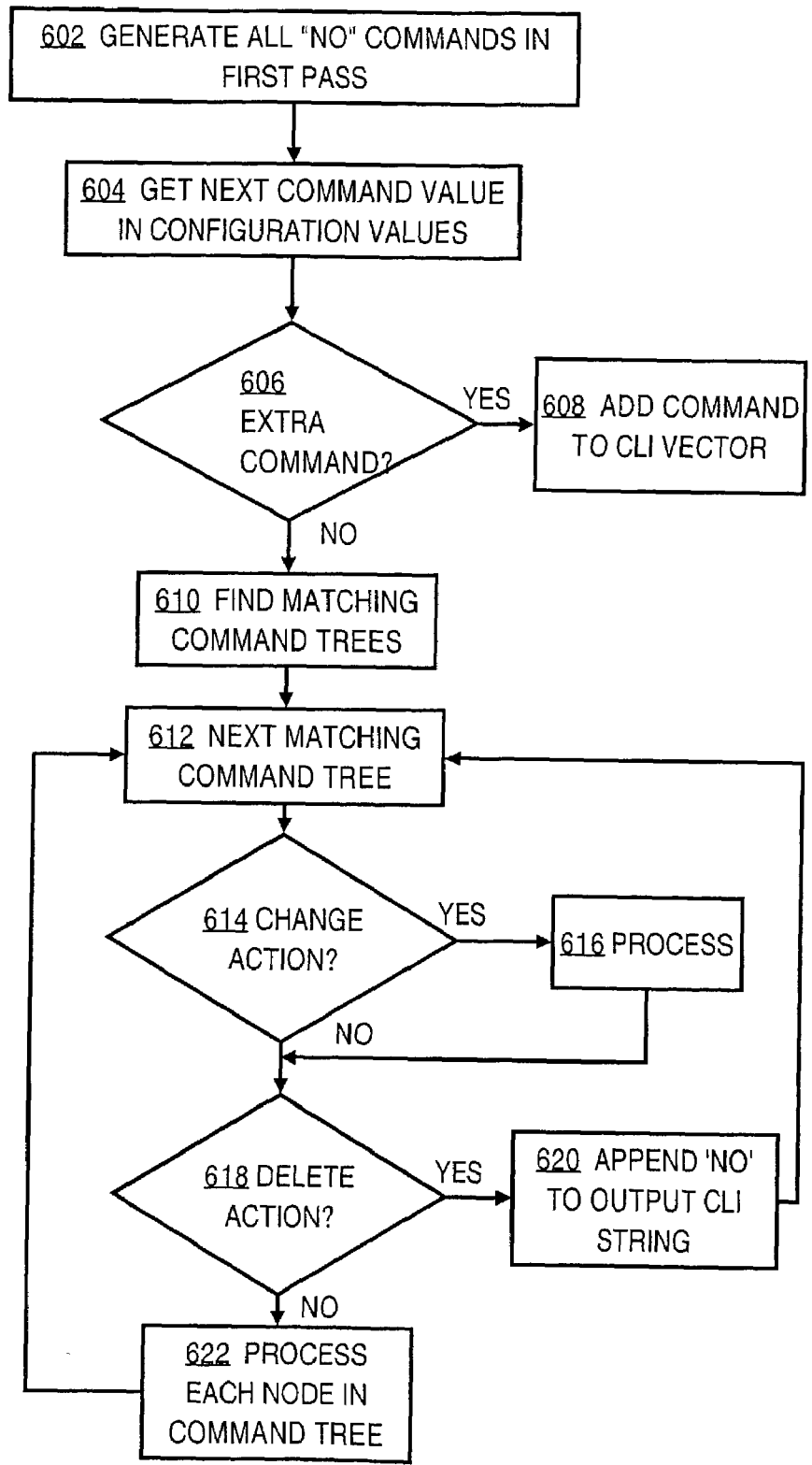
FIG. 6A, FIG. 6B, and FIG. 6C are flow diagrams that illustrate a process of automatically generating CLI command strings using CLI Builder 160.
Figure 6B:
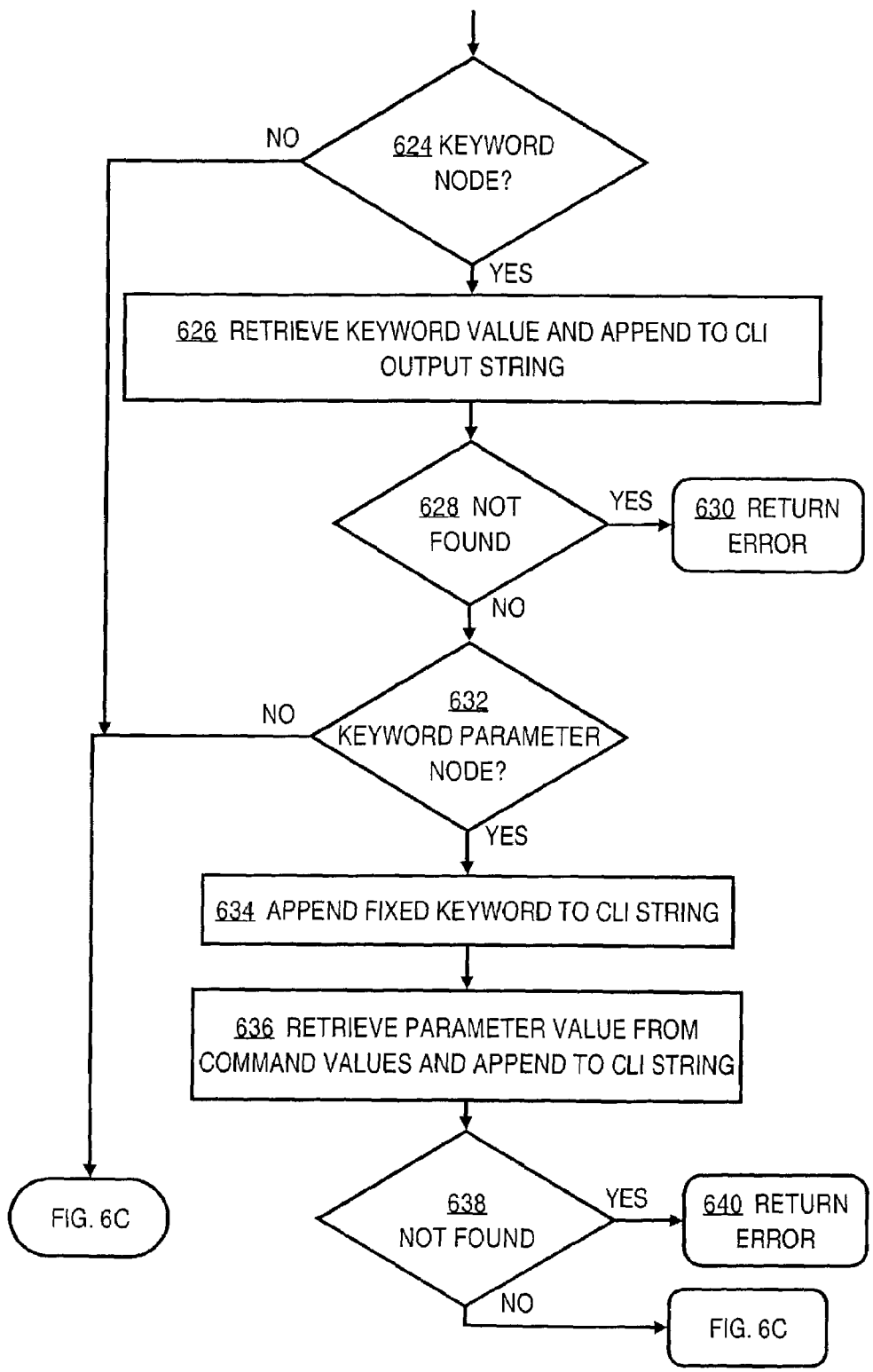
Figure 6C:
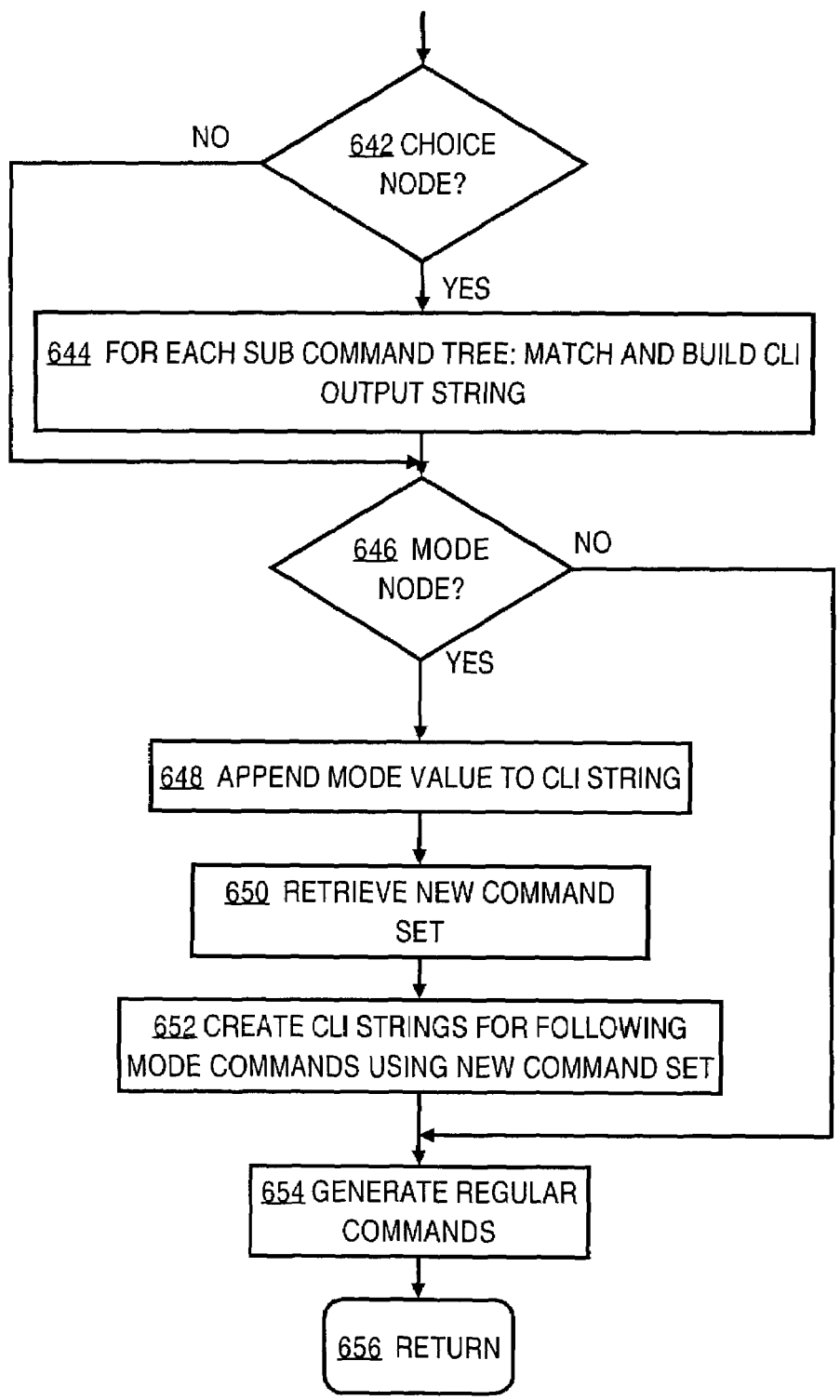

FIG. 6A, FIG. 6B, and FIG. 6C are flow diagrams that illustrate a process of automatically generating CLI command strings using CLI Builder 160. In one embodiment, CLI Builder 160 performs two code generation stages or passes. In a first pass, all NO commands are generated. In a second pass, all regular commands are generated. Referring first to FIG. 6A, as indicated in block 602, all NO commands are generated in a first pass using the logic described further herein. In block 604, the next command value in the Config Values object is retrieved. Thus, succeeding steps are performed for each command value in the Config Values object.

In block 606, a test is performed to determine whether the current command is an "extra" command. If an extra command is identified, then in block 608, the command is added to the CLI vector. Otherwise, in block 610, matching command trees for the then-current command name are found. The logic of blocks 612 to 622, inclusive, is then performed for each matching command tree.

In block 614, a test is performed to determine whether the then-current command tree represents a change action. If a change action is represented, then special processing is performed at block 616 to generate either a delete command followed by an add command, or just an add command. In an embodiment, the delete and add commands act on the_values parameter in the CmdValues object. The change command uses_oldValues for delete command, and_values for the add command. In one embodiment, rather than providing separate logic for the change action's delete command which works on_oldValues, the CLI Builder performs the following steps:
   save the_values object;
   set_values to_oldValues;
   set action to Delete.

Then the standard delete command logic is used to generate the delete portion of the change command. These values are then switched back for the add portion of the change command,
   set_values to the saved values
   set action to Add As a result, CLI Builder is provided with compact and highly reusable code.

In block 618, a test is performed to determine whether the then-current command tree specifies a delete action. If a delete action is specified, then the characters "no" are appended to the CLI output string.

At block 622, each node in the command tree is processed as set forth in FIG. 6B. Referring now to FIG. 6B, in block 624 a test is performed to determine whether a current node is a keyword node. If the node is a keyword node, then in block 626, the keyword value is retrieved and appended to the CLI output string. In one embodiment, using the key in the keyword node, the keyword value is retrieved from the Command Values object and appended to the CLI string. If the keyword value is not found, as tested in block 628, and the current node is a required node, then an error is returned, as shown by block 630.

In block 632, a test is performed to determine whether the current node is a keyword parameter node. If the node is a keyword parameter node, and the node also contains a fixed keyword, then the fixed keyword is appended to the CLI output string, as indicated by block 634. In block 636, a parameter value is retrieved from the Command Values object and appended to the CLI output string. For example, in one embodiment, using the key in the keyword parameter node, the parameter value is retrieved from the CmdValues object and appended to the CLI string. If the parameter value is not found, as tested in block 638, then an error is returned. In one embodiment, if the current node is a required node and the CmdValues doesn't contain the requested key, then an error is returned.

Referring now to FIG. 6C, if the current node is a choice node, as tested in block 642, then in block 644, for each sub command tree, command and parameter value matching is performed and CLI output strings are generated using the logic described above. If no match is found and the current node is a required node, then an error is returned.

In block 646, a test is performed to determine whether the current node is a mode node. If so, then in block 648, the mode value is appended to the CLI string. In block 650, a new command set for the current mode is retrieved. In block 652, one or more CLI strings are created for the following mode commands, using the new command set, and using the logic described above.

In block 654, all regular commands are generated in a second pass of the command generator, using the logic described above for NO commands.

Figure 7:
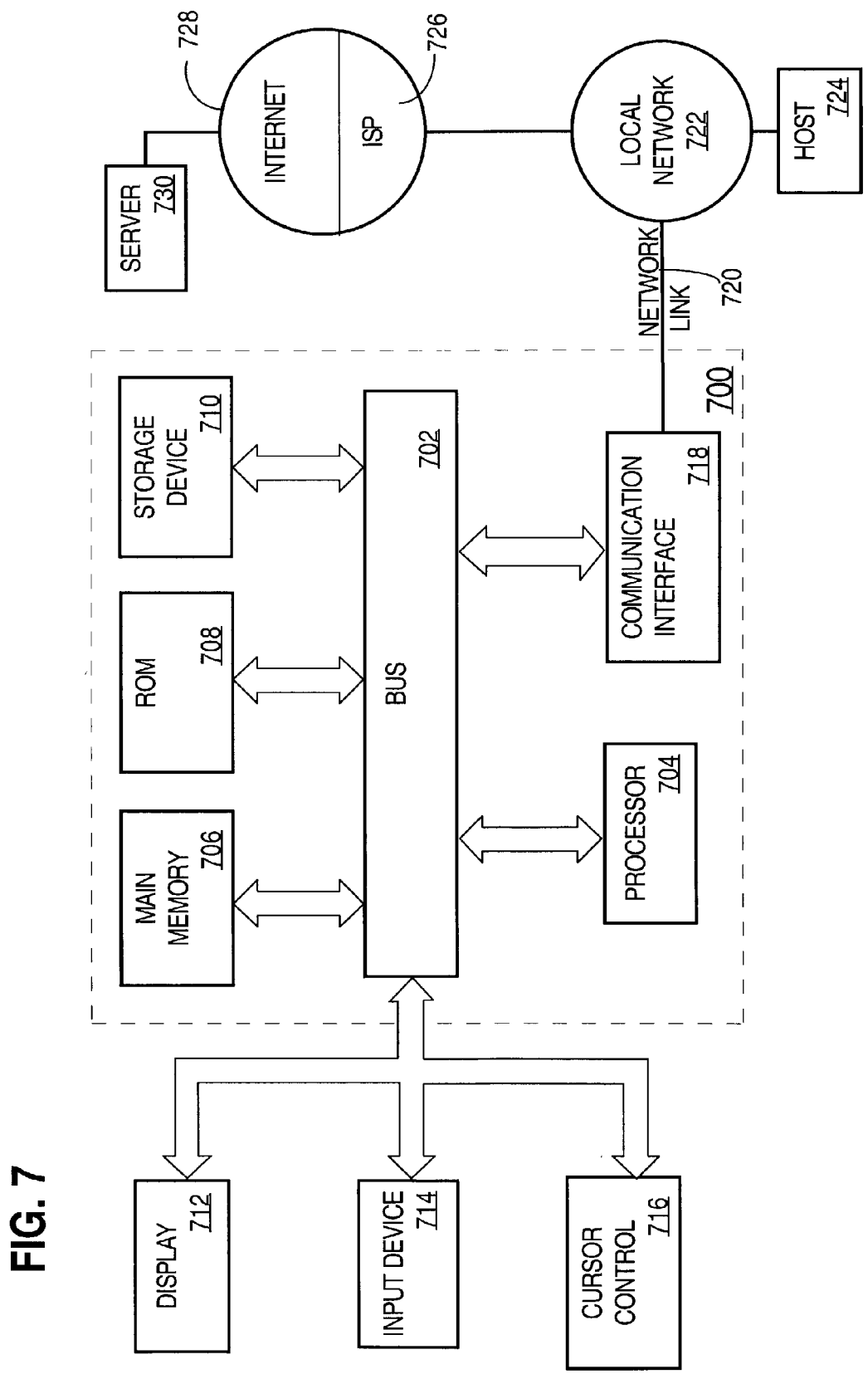
FIG. 7 is a block diagram that illustrates a computer system upon which an embodiment may be implemented.

In one embodiment, CLI Builder 160 is accessible programmatically using application programming interfaces having the following form:

public CliBuilder(String iosVersion, String deviceType,)

public CliBuilder(CmdSet cmdSet)

public Vector getClis(ConfigValues configValues) throws CliGPBException 4.0 Implementation Mechanisms—Hardware Overview FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for automatically generating a representation of network device configuration commands. According to one embodiment of the invention, automatically generating a representation of network device configuration commands is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for automatically generating a representation of network device configuration commands as described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, in certain embodiments, all syntax files are stored in a common location, which is known to application developers, so that developers can review and modify the syntax files. In another embodiment, parsing and CLI generation support command names that include "deny" or "permit" command names. Further, the Configuration Parser may be driven off a list of commands to be parsed. In yet another feature, commands that extend across multiple lines of a file are handled.

In still another feature, support is provided for a device address parameter type, which can be a hostname or IP address. Variable mode command definition may be supported in which different combinations of modes are used to specify common commands. For example: VoIP, VoATM, VoFR as one block, VoATM, VoFR as another. An automatic key generator may be provided for use in setting key-value pairs. An octal type parameter may be supported. In yet another feature, nested repeat clauses may be supported. For example, commands of the following form may be supported:

Cmd [(<param1>) [(key1 <param2>)]*]*

In still another embodiment, the Grammar Builder may provide error checking for commands that are missing mode commands.

APPENDIX A

EXAMPLE GRAMMAR RULES, SYNTAX FILE FORMAT, AND SYNTAX FILE CONTENTS

1. Grammar Rules
1.1. Parameter types
1.1.1. String
  Syntax: <str,key,min,max,def>
1.1.2. Long (multi token) String
  Syntax: <longstr,key>
  longstr is used to specify multi token strings. An example of this command:
    description link to campus backbone switch on 3rd floor
  would have the following syntax:
    description (<longstr, desc>)
1.1.3. Numeric
  Syntax: <int,key,min,max,def>
1.1.4. Keyword:
  Syntax: <keyword, key, value1 | value2 | . . ., def>
1.1.5. IP address
  Syntax: <ipaddr, key> where ipaddr is x.y.z.w
1.1.6. Interface/mode:
  Syntax: <mode, key, mode1 | mode2 | . . .>
Note: For all the parameters, min, max and default values are optional. The key value is used as the key in the Config Values object.
1.2. Token types
  Simple parameters: (<. . .>)
  Fixed keyword: (value)
  Keyword-parameter: (keyword <. . .>)
1.3. Syntax rules
  Space character acts as a delimiter. Extra spaces are ignored.
  The command is the first token of the CLI line
  Blank lines are supported
  Comment lines start with the semicolon ";" character.
  One command is entered on each line.
  A command can appear multiple times with different variations. Examples:
    zone (remote) (<str,gkName>) (<str,domain>) (<ipaddr,rasIPAddr>)
    (<int,rasPort>)
    zone (prefix) (<str,gkName>) (<str,zonePrefix>)
    [(<keyword,seqBlast,seq|blast>)] (<int,gwPriority>) (<str,gwAddr>)
  Allows common commands for each mode in the mode command
1.4. Commands:
1.4.1. Simple Required
  Cmd (. . .) (. . .)
  In this form of command, the parameter identified in parentheses are required for use when the command is expressed in a configuration file or created by the CLI Builder.
1.4.2. Simple Optional
  Cmd [(. . .)] [(. . .) (. . .)]
1.4.3. Optional choice
  Cmd [(. . .) (. . .) | (. . .) | (. . .)]
1.4.4. Required choice
  Cmd (. . .) {(. . .) (. . .) | (. . .) | (. . .)}
1.4.5. Nested optional:
  Cmd (. . .) [(. . .) [(. . .)] | (. . .) | (. . .)]
1.4.6. Nested req/optional:
  Cmd {(. . .) [(. . .)] | (. . .) | (. . .)}
1.4.7. Repeat
  The system supports both "0 or more" and "1 or more" type of repeat clauses. The repeat character, '*', is always placed right after the closing parenthesis ')' of the token. For example, a clause expressed as
    (<. . .>)*
  is a "repeat clause". By default, this is a "1 or more" notation. For "0 or more", the repeat clause is enclosed in the optional clause as:
    Cmd [(optional clause)*]
  Example command syntax making use of the repeat clause is:
    no zone (prefix) (<str,gkName>,) [(gw-priority < int,gwPriority,0,10>)
    (<str,gwAddr>)*]
  An example of this command with the repeat clause appearing 3 times:
    zone prefix gk1 gw-priority 5 gw1 gw2 gw3
  In the above example, the value of gwAddr would be "gw1;gw2;gw3".
1.4.8. Simple Interface/mode:
  The simple interface mode is used when there are separate commands for a "mode". The Gatekeeper command is an example of this kind of command. After issuing the Gatekeeper command, in one embodiment, the operating system enters a gatekeeper mode. The command prompt also changes to reflect the new mode.
    %cmd . . .
      cmd1 . . .
      cmd2 . . .
      cmd3 . . .
    %
1.4.9. Variable interface/mode:

APPENDIX A-continued

EXAMPLE GRAMMAR RULES, SYNTAX FILE FORMAT, AND SYNTAX FILE CONTENTS

This mode is the same as the Simple interface/mode, but commands can be different depending on some option. The Dial-peer command is an example. The sub commands for the dial-peer mode depend on whether the last keyword is POTS, VOIP, VOATM, or VOFR.

```
%cmd . . . (<mode, common | mode1 | mode2 | . . . >)
#common
  cmd 1
  cmd 2
#mode1
  cmd3
  cmd4
#mode2
  cmd3
  cmd5
. . .
%
```

In this example, cmd1 and cmd2 are common to all the modes. The possible options listed for the mode don't have match exactly with the actual values in the configuration. A match exists if the actual value starts with one of the listed modes.

```
%Interface (<mode, ifType, Serial | Ethernet | FastEthernet>)
#Ethernet
; list all the Ethernet commands here.
#Serial
; list all the serial commands here
.
.
.%
```

In this example, the system selects the Ethernet commands as long as ifType starts with Ethernet. Thus, the actual value of ifType can be Ethernet0/0, Ethernet1/1, etc. This is only for the purpose of selecting the correct command set. The Config Values would still contain the full value for ifType - Ethernet0/0, Ethernet1/1, etc.

1.4.10.  no command:
   Syntax:
      Single Instance command: @no cmd (. . .) (. . .) @ (. . .)
      Multiple instance command: @no_m cmd (. . .) (. . .) @ (. . .)

Only the portion between the @ symbols needs to be generated to issue the "no" command. For optional clauses, the ending @ character must be specified for each clause. Example:
   @no cmd [(. . .) @ (. . .) | (. . .)@ | (. . .)@)] (. . .)

If no ending @ is specified, the entire command is generated for the no command. Refer to the CLI Builder section for more discussion on single and multiple instance commands.

1.4.11.  Incremental syntax file

An incremental syntax file only needs to contain commands that are either new, or deleted, or changed in any way. The Grammar Builder 152 uses the base grammar object specified in the version mapping file, and create new grammar object with all the changes specified in the incremental syntax file.

In an incremental syntax file, to signify that a command is added, the new command is listed. To signify that a command is changed, that command is specified again with the new syntax. To signify that a command is totally removed, the command is specified with a "−" (minus) sign in front of it. Example:
   @ no fax-rate @ (<keyword,faxRate,12000|14400|2400|4800|7200|9600|voice|disable>)
   @ [(bytes <int,noOfBytes,20,48,>)]

2.  Syntax file notation

| Notation | Meaning | Example |
| --- | --- | --- |
| @ | Start and end of a 'no' section for CLI generation | @no cmd (p1) @ (p2) |
| no | Command is a single instance command that supports 'no' mode | @no cmd (p1) @ (p2) |
| no_m | Command is a multiple instance command that supports 'no' mode | @no_m cmd2 (p1) @ (p2) |
| % | Start and end of a mode section | % @no cmd1<br>cmd1-1<br>cmd1-2<br>% |
| # | Start of one of the mode command sets | % @no cmd2 (<mode, iftype, E\|FE>)<br>#E<br>. . .<br>#FE<br>. . .<br>% |
| - | Remove the command from the grammar object | - @no cmd3 |
| < > | Parameter portion of the keyword-parameter token | Cmd2 (fixedkeyword <int, key, 1,10>) |
| ( ) | Encloses a command token | Cmd2 (p1) (<int, key, 1, 10>) |
| [ ] | Optional clause | Cmd2 (p1) [(<int, key, 1, 10>)] |

APPENDIX A-continued

EXAMPLE GRAMMAR RULES, SYNTAX FILE FORMAT, AND SYNTAX FILE CONTENTS

| { } | Required clause | Cmd2 (p1) {(p3) \| (<int, key, 1, 10>)} |
| --- | --- | --- |
| \| | Choice | Cmd2 (<keyword, key2, value1 \| value2 \| value 3>) |
| ; | Comment | ; this is a comment |
| #include | Nested syntax file | #include vpncmds.txt |
| * | Repeat token | Cmd2 (<ipaddr, addr>)* |

3.      Assumptions
 All keys in optional/required repeat clause have values.
Example: gw-type-prefix <prefix> [gw (ipaddr <ipaddr> [<int,port>]]*
For this command, the operating system returns a port number for each gateway entry
whether or not the user specified it during configuration. If it was not configured, a default
port value is returned. Therefore, the Command Values object must have a value for each key
in its repeat clause.
4.      Sample Syntax Files
4.1.    Base syntax file
This is short (truncated) version of the full 12.1(2)T operating system version for 3640
platform used by CVM:
%interface (<str,interface>)
ip (address) (<ipaddr, interfaceIP>) [(<ipaddr, interfaceSubnet>)]
standby {(ip <ipaddr,standbyIP>) [(secondary)] | (priority <int,standbyPriority,0,255>)}
%
;----------Gatekeeper-------------|----------------------
% @ no gatekeeper
@no lrq {(forward-queries,forwardQueries) | (reject-unknown-prefix,rejectUnknownPrefix)}
@no_m gw-type-prefix (<str,typePrefix>) [(hopoff <str,hopoffZoneName>)] [(default-
technology,defaultKey)] [(gw) (ipaddr <ipaddr, gwAddr>) [(<int,gwPort,1,65535>)]]*
@no_m zone (prefix) (<str,gkName>) (<str,zonePrefix>) [(gw-priority <int,gwPriority,0,10>)
(<str,gwAddr>)*]
@no_m zone (remote) (<str,gkName>) (<str,domain>) @ (<ipaddr,rasIPAddr>)
[(<int,rasPort,1,65535,1719>)]
%
;--------------------------Dial Peer---------------------------------------------
% @ no dial-peer (voice <int,dialPeerTag,1,2147483647>) @
(<mode,dialPeerType,common|pots|voip|voatm|vofr>)
;------------Common for all modes POTS,VoIP,VoATM,VoFR----------------------------
common
@ no answer-address @ (<str,answerAddressNum>)
@ no information-type @ (<keyword,informationType,fax|voice>)
@ no max-conn @ (<int,maxConns,1,2147483647>)
@ no numbering-type @ (<keyword,numberingType,abbreviated|international|national|network|
reserved|subscriber|unknown>)
;--------------------------------POTS----------------------------------
pots
@ no register (e164)
@ no session (target @ <keyword,sessionTarget,loopback:compressed|loopback:uncompressed>)
;--------------------------------VOIP----------------------------------
voip
@ no acc-qos @ (<keyword,accQosType, best-effort|controlled-load|guaranteed-delay>)
@ no clid_restrict
@ no dtmf-relay {[(cisco-rtp)] [(h245-alphanumeric)][(h245-signal)]}
@ no expect-factor @ (<int,expectFactor,0,20>)
@ no voice-class (<keyword,voiceClassType,codec|h323|permanent>) @
(<int,voiceClassTag,1,10000>)
@ no codec @
(<keyword,codecType,g711alaw|g711ulaw|g723ar53|g723ar63|g723r53|g723r63|g726r16|g726r24|g7
26r32|g728|g729abr8|g729ar8|g729br8|g729r8|gsmfr>) @ [(bytes <int,codecBytes,20,240>)]
@ no fax-rate @ (<keyword,faxRate,12000|14400|2400|4800|7200|9600|voice|disable>) @ [(bytes
<int,faxBytes,20,48,>)]
;dummy command. Its only purpose is to pass the codec type for SIP to the UI.
@ no sipcodec @
(<keyword,sipCodecType,g711alaw|g711ulaw|g723ar53|g723ar63|g723r53|g723r63|g726r16|g726r24|
g726r32|g728|g729abr8|g729ar8>) @ [(bytes <int,codecBytes,20,240>)]
;--------------------------------VOATM----------------------------------
voatm
@ no session (protocol @ <keyword,sessionProtocol,cisco-switched|aal2-trunk>)
;subChannelId is only present if session protocol is set to aal2-trunk.
@ no session (target @ <str,sessionTarget>) (pvc <str,pvc>) [(<int,subChannelId,0,255>)]
;---Common for Voip, VoFR, VOATM------
@ no codec @
(<keyword,codecType,g711alaw|g711ulaw|g723ar53|g723ar63|g723r53|g723r63|g726r16|g726r24|g7
26r32|g728|g729abr8|g729ar8|g729br8|g729r8|gsmfr>) @ [(bytes <int,codecBytes,20,240>)]
@ no fax-rate @ (<keyword,faxRate,12000|14400|2400|4800|7200|9600|voice|disable>) @ [(bytes
<int,faxBytes,20,48,>)]
@ no signal-type @ (<keyword,signalType,cas|cept|ext-signal|trans>)
;--------------------------------VOFR----------------------------------

APPENDIX A-continued

EXAMPLE GRAMMAR RULES, SYNTAX FILE FORMAT, AND SYNTAX FILE CONTENTS

```
#vofr
@ no session (protocol @ <keyword,sessionProtocol,cisco-switched|frf11-trunk>)
;subChannelId is only present if session protocol is set to aal2-trunk.
@ no session (target @ <str,sessionTarget>) (<int,dlci,16,1007>) [(<int,subChannelId,0,255>)]
;---Common for Voip, VoFR, VOATM------
@ no codec @
(<keyword,codecType,g711alaw|g711ulaw|g723ar53|g723ar63|g723r53|g723r63|g726r16|g726r24|g7
26r32|g728|g729abr8|g729ar8|g729br8|g729r8|gsmfr>) @ [(bytes <int,codecBytes,20,240>)]
@ no fax-rate @ (<keyword,faxRate,12000|14400|2400|4800|7200|9600|voice|disable>) @ [(bytes
<int,faxBytes,20,48,>)]
@ no signal-type @ (<keyword,signalType,cas|cept|ext-signal|trans>)
%
4.2.    Incremental syntax file
This is short (truncated) version of the incremental 12.1(3a)T ios version for 3640 platform
used by CVM. These changes are applied to the 12.1(2)T grammar object to come up with a
new grammar object for 12.1(3a)T. As this file shows, the 12.1(3a)T version has the
following changes:
    "Voice class" added a new option
    voip section under the dial-peer command has changes in "session protocol" and "codec"
    commands, "fax-rate" command is deleted, and "fax rate" command is added.
    Sip-ua commands are added
;IOS (tm) 3600 Software (C3640-JS-M), Version 12.1(3a)T1, RELEASE SOFTWARE (fc1)
% @ no voice (class <keyword,voiceClassType,busyout|codec|dualtone|h323|permanent>)
(<int,voiceClassTag,1,10000>)
%
;------------------------Dial Peer----------------------------------------
% @ no dial-peer (voice <int,dialPeerTag,1,2147483647>) @
(<mode,dialPeerType,common|pots|voip|voatm|vofr>)
;--------------------------------VOIP------------------------------------
#voip
@ no session (protocol @ <keyword,sessionProtocol,cisco|multicast|sipv2>)
@ no codec @ (<keyword,codecType,g726r32|g728|g729br8|gsmefr|gsmfr|clear-
channel|g711alaw|g711ulaw|g723ar53|g723r53|g726r16|g726r16|g723ar63|g723r63>) @ [(bytes
<int,codecBytes,20,240>)]
-@ no fax-rate @ (<keyword,faxRate,12000|14400|2400|4800|7200|9600|voice|disable>) @ [(bytes
<int,noOfBytes,20,48,>)]
@ no fax (rate @ <keyword,faxRate,voice|disable|2400|4800|7200|9600|12000|14400>) @ [(bytes
<int,faxBytes,20,48,>)]
%
;-----------------------SIP--------------------
% @no sip-ua
@no max-forwards @ (<int,maxForwards,1,15,6>)
@no__m retry {(bye <int,bye,1,10,6>) |(cancel <int,cancel,1,10,6>) |(invite <int,invite,1,10,6>)|
(response <int,response,1,10,6>)}
@no sip-server (<str,serverName>)
@no__m timers {(connect <int,connect,100,1000,500>) |(disconnect <int,disconnect,100,1000,500>)|
(expires <int,expires,60000,300000,180000>)|(trying <int,trying,100,1000,500>)}
@no transport (<keyword,protocol,udp|tcp>)
%
```

APPENDIX B

EXAMPLE VERSION MAPPING

```
;--for 3640 platform---
12.1(2)T = 12.1(2)T
12.1(3a)T = 12.1(2)T, 12.1(3a)T
12.1(5)T = 12.1(3a)T, 12.1(5)T
12.1(5)XM = 12.1(5)T, 12.1(5)XM
12.2.0 = 12.1(5)XM, 12.2.0
12.2(1) = 12.1(5)XM, 12.2(1)
12.1(2a)T = 12.1(2)T
12.1(2) = 12.1(2)T
12.1(3)T = 12.1(3a)T
12.1(3) = 12.1(3a)T
12.1(3a) = 12.1(3a)T
12.1(5) = 12.1(5)T
12.2(0.21)T = 12.2.0
12.2(0.5f) = 12.2(1)
12.2(0.19)T = 12.2.0
;---for 17xx platform----
12.1(2)T-17xx = 12.1(2)T, 12.1(2)T-17xx
12.1(3a)T-17xx = 12.1(3a)T, 12.1(3a)T-17xx
12.2(5)T-17xx = 12.1(5)T, 12.1(5)T-17xx
12.2(1)-17xx = 12.2(1),12.2(1)-17xx
;--for 26xx platform-----
12.1(3a)T-26xx = 12.1(3a)T, 12.1(3a)T-26xx
;---for 3810 platform-----
12.1(2)T-3810 = 12.1(2)T, 12.1(2)T-3810
12.1(3a)T-3810 = 12.1(3a)T, 12.1(3a)T-3810
12.1(5)T-3810 = 12.1(5)T, 12.1(5)T-3810
12.2(1)-3810 = 12.2(1), 12.2(1)-3810
;--for 53xx platform---
12.1(2)T-5xxx = 12.1(2)T, 12.1(2)T-5xxx
12.1(3a)T-5xxx = 12.1(3a)T, 12.1(3a)T-5xxx
12.1(5)T-5xxx = 12.1(5)T, 12.1(5)T-5xxx
12.1(5)XM-5xxx = 12.1(5)XM, 12.1(5)XM-5xxx
12.2(1)-5xxx = 12.2(1), 12.2(1)-5xxx
;---for 7xxx platform-----
12.1(2)T-7xxx = 12.1(2)T, 12.1(2)T-7xxx
```

APPENDIX B-continued

EXAMPLE VERSION MAPPING 12.1(3a)T-7xxx = 12.1(3a)T, 12.1(3a)T-7xxx
12.1(5)T-7xxx = 12.1(5)T, 12.1(5)T-7xxx
12.1(5)XM-7xxx = 12.1(5)XM, 12.1(5)XM-7xxx
12.2(1)-7xxx = 12.2(1), 12.2(1)-7xxx

What is claimed is:

1. A method of automatically parsing one or more configuration commands for a network device that uses a command-line interface and generating a representation of the commands, using a grammar-based framework, comprising the computer-implemented steps of:

receiving one or more syntax definitions for a grammar associated with the command-line interface;

compiling the syntax definitions into a grammar object that represents the grammar, wherein the grammar object includes one or more parameter values associated with commands of the command-line interface;

wherein the grammar object comprises one or more data structures, wherein each data structure stores syntactic information about a specific command of the commands of the command-line interface;

receiving a configuration of the network device;

parsing the configuration using the grammar object;

wherein parsing the configuration comprises searching the one or more data structures in the grammar object to locate a matching data structure that is associated with a configuration command included in the configuration;

creating and storing one or more configuration values associated with the commands, based on parsing the configuration.

2. A method as recited in claim 1, further comprising the steps of:

receiving a version identifier that specifies a version of the network device and a device type value that identifies a type of the network device;

selecting a grammar object from among a plurality of grammar objects based on the version identifier and the device type value.

3. A method as recited in claim 1, further comprising the steps of:

receiving the configuration values; and automatically generating one or more device CLI commands based on the configuration values and the grammar object.

4. A method as recited in claim 1, further comprising the steps of:

creating and storing a mapping of the grammar object to a second syntax definition for a second command grammar to which commands of a second version of the CLI conform;

receiving a version identifier;

applying the second syntax definition to the grammar object based on looking up the version identifier in the mapping.

5. A method as recited in claim 1, further comprising the steps of:

creating and storing a mapping of the grammar object to a second syntax definition for a second command grammar to which commands of a second version of the CLI conform, wherein the second syntax definition comprises one or more syntax statements that incrementally update the first syntax definition;

receiving a version identifier;

applying the second syntax definition to the grammar object based on looking up the version identifier in the mapping.

6. A method as recited in claim 1, wherein each of the one or more syntax definitions comprises a plurality of syntax statements, wherein each of the syntax statements comprises a keyword and one or more parameter definitions, and wherein each of the parameter definitions comprises a type identifier, a key name, and one or more allowed values.

7. A method as recited in claim 6, wherein each of the one or more syntax definitions further comprises a plurality of mode blocks that define a plurality of CLI commands acceptable by the network device only when the network device is operating in an associated mode.

8. A method as recited in claim 7, wherein each of the one or more syntax definitions further comprises a common block that defines CLI commands common to all the modes.

9. A method as recited in claim 4, wherein the mapping comprises a map statement that maps a second grammar object to both a first grammar object and an incremental update syntax definition.

10. A method as recited in claim 4, wherein the mapping comprises a map statement that maps a second grammar object associated with a specific network device platform to a first grammar object.

11. A method as recited in claim 1, wherein the parsing step further comprises parsing only commands of the configuration that are represented in the grammar object.

12. A method as recited in claim 1, wherein the configuration values comprise a vector of command values, wherein each of the command values comprises one or more key-value pairs.

13. A method as recited in claim 1, further comprising the steps of:

determining whether parsing a particular statement of the syntax definition results in a syntax error, and if so, storing the particular statement as an extra command.

14. A method as recited in claim 3, further comprising the step of automatically generating the CLI commands according to an order of the configuration values.

15. A method as recited in claim 11, further comprising the step of automatically generating the CLI commands based on values of action parameters of command objects.

16. A method as recited in claim 2, further comprising the step of generating all necessary "NO" commands before generating any other commands.

17. A method as recited in claim 1, further comprising the step of providing the parameter values to an external application for use in the external application for one of: customization of a graphical user interface; or range checking.

18. A method of automatically generating a representation of one or more configuration commands for a network device that uses a command-line interface, comprising the computer-implemented steps of:

receiving a first syntax definition for a first command grammar to which commands of a first version of the command-line interface ("CLI") conform;

compiling the syntax definition into a grammar object that represents the grammar;

wherein the grammar object comprises one or more data structures, wherein each data structure stores syntactic information about a specific command of the commands of the first version of the CLI;

creating and storing a mapping of the grammar object to a second syntax definition for a second command grammar to which commands of a second version of the CLI conform;

receiving a version identifier;

applying the second syntax definition to the grammar object based on looking up the version identifier in the mapping;

receiving one or more configuration values associated with a configuration command to be generated for the network device; and automatically creating one or more configuration commands for the network device based on the configuration values and the grammar object;

wherein automatically creating the one or more configuration commands comprises, for each of the one or more configuration commands, searching the one or more data structures in the grammar object to locate a matching data structure that is associated with that configuration command.

19. A method as recited in claim 18, wherein the step of automatically creating one or more configuration commands further comprises the steps of:

automatically generating one or more device CLI commands based on the configuration values and the grammar object.

20. A computer-readable storage medium carrying one or more sequences of instructions for automatically parsing one or more configuration commands for a network device that uses a command-line interface and generating a representation of the commands, using a grammar-based framework, which instructions, when executed by one or more processors, cause the one or more processors to carry out the steps of:

receiving one or more syntax definitions for a grammar associated with the command-line interface;

compiling the syntax definitions into a grammar object that represents the grammar, wherein the grammar object includes one or more parameter values associated with commands of the command-line interface;

wherein the grammar object comprises one or more data structures, wherein each data structure stores syntactic information about a specific command of the commands of the command-line interface;

receiving a configuration of the network device;

parsing the configuration using the grammar object;

wherein parsing the configuration comprises searching the one or more data structures in the grammar object to locate a matching data structure that is associated with a configuration command included in the configuration;

creating and storing one or more configuration values associated with the commands, based on parsing the configuration.

21. A computer-readable medium as recited in claim 20, wherein the one or more sequences of instructions further comprise instructions which, when executed by the one or more processors, cause the one or more processors to carry out the steps of:

receiving a version identifier that specifies a version of the network device and a device type value that identifies a type of the network device;

selecting a grammar object from among a plurality of grammar objects based on the version identifier and the device type value.

22. A computer-readable medium as recited in claim 20, wherein the one or more sequences of instructions further comprise instructions which, when executed by the one or more processors, cause the one or more processors to carry out the steps of:

receiving the configuration values; and automatically generating one or more device CLI commands based on the configuration values and the grammar object.

23. A computer-readable medium as recited in claim 20, wherein the one or more sequences of instructions further comprise instructions which, when executed by the one or more processors, cause the one or more processors to carry out the steps of:

creating and storing a mapping of the grammar object to a second syntax definition for a second command grammar to which commands of a second version of the CLI conform;

receiving a version identifier;

applying the second syntax definition to the grammar object based on looking up the version identifier in the mapping.

24. A computer-readable medium as recited in claim 20, wherein the one or more sequences of instructions further comprise instructions which, when executed by the one or more processors, cause the one or more processors to carry out the steps of:

creating and storing a mapping of the grammar object to a second syntax definition for a second command grammar to which commands of a second version of the CLI conform, wherein the second syntax definition comprises one or more syntax statements that incrementally update the first syntax definition;

receiving a version identifier;

applying the second syntax definition to the grammar object based on looking up the version identifier in the mapping.

25. A computer-readable medium as recited in claim 20, wherein each of the one or more syntax definitions comprises a plurality of syntax statements, wherein each of the syntax statements comprises a keyword and one or more parameter definitions, and wherein each of the parameter definitions comprises a type identifier, a key name, and one or more allowed values.

26. A computer-readable medium as recited in claim 25, wherein each of the one or more syntax definitions further comprises a plurality of mode blocks that define a plurality of CLI commands acceptable by the network device only when the network device is operating in an associated mode.

27. A computer-readable medium as recited in claim 26, wherein each of the one or more syntax definitions further comprises a common block that defines CLI commands common to all the modes.

28. A computer-readable medium as recited in claim 23, wherein the mapping comprises a map statement that maps a second grammar object to both a first grammar object and an incremental update syntax definition.

29. A computer-readable medium as recited in claim 23, wherein the mapping comprises a map statement that maps a second grammar object associated with a specific network device platform to a first grammar object.

30. A computer-readable medium as recited in claim 20, wherein the parsing step further comprises parsing only commands of the configuration that are represented in the grammar object.

31. A computer-readable medium as recited in claim 20, wherein the configuration values comprise a vector of command values, wherein each of the command values comprises one or more key-value pairs.

32. A computer-readable medium as recited in claim 20, wherein the one or more sequences of instructions further comprise instructions which, when executed by the one or more processors, cause the one or more processors to carry out the steps of:
  determining whether parsing a particular statement of the syntax definition results in a syntax error, and if so, storing the particular statement as an extra command.

33. A computer-readable medium as recited in claim 22, wherein the one or more sequences of instructions further comprise instructions which, when executed by the one or more processors, cause the one or more processors to carry out the step of automatically generating the CLI commands according to an order of the configuration values.

34. A computer-readable medium as recited in claim 33, wherein the one or more sequences of instructions further comprise instructions which, when executed by the one or more processors, cause the one or more processors to carry out the step of automatically generating the CLI commands based on values of action parameters of command objects.

35. A computer-readable medium as recited in claim 20, wherein the one or more sequences of instructions further comprise instructions which, when executed by the one or more processors, cause the one or more processors to carry out the step of generating all necessary "NO" commands before generating any other commands.

36. An apparatus having computer for automatically parsing one or more configuration commands for a network device that uses a command-line interface and generating a representation of the commands, using a grammar-based framework, comprising:
  means for receiving one or more syntax definitions for a grammar associated with the command-line interface;
  means for compiling the syntax definitions into a grammar object that represents the grammar, wherein the grammar object includes one or more parameter values associated with commands of the command-line interface;
  wherein the grammar object comprises one or more data structures, wherein each data structure stores syntactic information about a specific command of the commands of the command-line interface;
  means for receiving a configuration of the network device;
  means for parsing the configuration using the grammar object;
  wherein the means for parsing the configuration comprise means for searching the one or more data structures in the grammar object to locate a matching data structure that is associated with a configuration command included in the configuration;
  means for creating and storing one or more configuration values associated with the commands, based on parsing the configuration.

37. An apparatus as recited in claim 36, further comprising:
  means for receiving a version identifier that specifies a version of the network device;
  means for selecting a grammar object from among a plurality of grammar objects based on the version identifier.

38. An apparatus as recited in claim 36, further comprising:
  means for receiving the configuration values; and
  means for automatically generating one or more device CLI commands based on the configuration values, and the grammar object.

39. An apparatus as recited in claim 36, further comprising:
  means for creating and storing a mapping of the grammar object to a second syntax definition for a second command grammar to which commands of a second version of the CLI conform;
  means for receiving a version identifier;
  means for applying the second syntax definition to the grammar object based on looking up the version identifier in the mapping.

40. An apparatus as recited in claim 36, further comprising:
  means for creating and storing a mapping of the grammar object to a second syntax definition for a second command grammar to which commands of a second version of the CLI conform, wherein the second syntax definition comprises one or more syntax statements that incrementally update the first syntax definition;
  means for receiving a version identifier;
  means for applying the second syntax definition to the grammar object based on looking up the version identifier in the mapping.

41. An apparatus as recited in claim 36, wherein each of the one or more syntax definitions comprises a plurality of syntax statements, wherein each of the syntax statements comprises a keyword and one or more parameter definitions, and wherein each of the parameter definitions comprises a type identifier, a key name, and one or more allowed values.

42. An apparatus as recited in claim 41, wherein each of the one or more syntax definitions further comprises a plurality of mode blocks that define a plurality of CLI commands acceptable by the network device only when the network device is operating in an associated mode.

43. An apparatus as recited in claim 42, wherein each of the one or more syntax definitions further comprises a common block that defines CLI commands common to all the modes.

44. An apparatus as recited in claim 39, wherein the mapping comprises a map statement that maps a second grammar object to both a first grammar object and an incremental update syntax definition.

45. An apparatus as recited in claim 40, wherein the mapping comprises a map statement that maps a second grammar object associated with a specific network device platform to a first grammar object.

46. An apparatus as recited in claim 36, wherein the means for parsing further comprises means for parsing only commands of the configuration that are represented in the grammar object.

47. An apparatus as recited in claim 36, wherein the configuration values comprise a vector of command values, wherein each of the command values comprises one or more key-value pairs.

48. An apparatus as recited in claim 36, further comprising:
  means for determining whether parsing a particular statement of the syntax definition results in a syntax error, and if so, storing the particular statement as an extra command.

49. An apparatus as recited in claim 38, further comprising means for automatically generating the CLI commands according to an order of the configuration values.

50. An apparatus as recited in claim 49, further comprising: means for automatically generating the CLI commands based on values of action parameters of command objects.

51. An apparatus as recited in claim 37, further comprising: means for generating all necessary "NO" commands before generating any other commands.

52. An apparatus for automatically parsing one or more configuration commands for a network device that uses a command-line interface and generating a representation of the commands, using a grammar-based framework, comprising:
- a network interface that is coupled to the data network for receiving one or more packet flows therefrom;
- a processor;
- one or more stored sequences of instructions which, when executed by the processor, cause the processor to carry out the steps of:
  - receiving one or more syntax definitions for a grammar associated with the command-line interface;
  - compiling the syntax definitions into a grammar object that represents the grammar, wherein the grammar object includes one or more parameter values associated with commands of the command-line interface;
  - wherein the grammar object comprises one or more data structures, wherein each data structure stores syntactic information about a specific command of the commands of the command-line interface;
  - receiving a configuration of the network device;
  - parsing the configuration using the grammar object;
  - wherein parsing the configuration comprises searching the one or more data structures in the grammar object to locate a matching data structure that is associated with a configuration command included in the configuration;
  - creating and storing one or more configuration values associated with the commands, based on parsing the configuration.

53. An apparatus as recited in claim 52, wherein the one or more stored sequences of instructions further comprise instructions which, when executed by the processor, cause the processor to carry out the steps of:
- receiving a version identifier that specifies a version of the network device;
- selecting a grammar object from among a plurality of grammar objects based on the version identifier.

54. An apparatus as recited in claim 52, wherein the one or more stored sequences of instructions further comprise instructions which, when executed by the processor, cause the processor to carry out the steps of:
- receiving the configuration values; and
- automatically generating one or more device CLI commands based on the configuration values and the grammar object.

55. An apparatus as recited in claim 52, wherein the one or more stored sequences of instructions further comprise instructions which, when executed by the processor, cause the processor to carry out the steps of:
- creating and storing a mapping of the grammar object to a second syntax definition for a second command grammar to which commands of a second version of the CLI conform;
- receiving a version identifier;
- applying the second syntax definition to the grammar object based on looking up the version identifier in the mapping.

56. An apparatus as recited in claim 52, wherein the one or more stored sequences of instructions further comprise instructions which, when executed by the processor, cause the processor to carry out the steps of:
- creating and storing a mapping of the grammar object to a second syntax definition for a second command grammar to which commands of a second version of the CLI conform, wherein the second syntax definition comprises one or more syntax statements that incrementally update the first syntax definition;
- receiving a version identifier;
- applying the second syntax definition to the grammar object based on looking up the version identifier in the mapping.

57. An apparatus as recited in claim 52, wherein each of the one or more syntax definitions comprises a plurality of syntax statements, wherein each of the syntax statements comprises a keyword and one or more parameter definitions, and wherein each of the parameter definitions comprises a type identifier, a key name, and one or more allowed values.

58. An apparatus as recited in claim 57, wherein each of the one or more syntax definitions further comprises a plurality of mode blocks that define a plurality of CLI commands acceptable by the network device only when the network device is operating in an associated mode.

59. An apparatus as recited in claim 58, wherein each of the one or more syntax definitions further comprises a common block that defines CLI commands common to all the modes.

60. An apparatus as recited in claim 55, wherein the mapping comprises a map statement that maps a second grammar object to both a first grammar object and an incremental update syntax definition.

61. An apparatus as recited in claim 55, wherein the mapping comprises a map statement that maps a second grammar object associated with a specific network device platform to a first grammar object.

62. An apparatus as recited in claim 52, wherein the parsing step further comprises parsing only commands of the configuration that are represented in the grammar object.

63. An apparatus as recited in claim 52, wherein the configuration values comprise a vector of command values, wherein each of the command values comprises one or more key-value pairs.

64. An apparatus as recited in claim 52, wherein the one or more stored sequences of instructions further comprise instructions which, when executed by the processor, cause the processor to carry out the steps of:
- determining whether parsing a particular statement of the syntax definition results in a syntax error, and if so, storing the particular statement as an extra command.

65. An apparatus as recited in claim 64, wherein the one or more stored sequences of instructions further comprise instructions which, when executed by the processor, cause the processor to carry out the step of automatically generating the CLI commands according to an order of the configuration values.

66. An apparatus as recited in claim 62, wherein the one or more stored sequences of instructions further comprise instructions which, when executed by the processor, cause the processor to carry out the step of automatically generating the CLI commands based on values of action parameters of command objects.

67. An apparatus as recited in claim 63, wherein the one or more stored sequences of instructions further comprise instructions which, when executed by the processor, cause the processor to carry out the step of generating all necessary "NO" commands before generating any other commands.

* * * * *